(12) United States Patent
Schechter et al.

(10) Patent No.: US 7,219,340 B2
(45) Date of Patent: May 15, 2007

(54) CHANGEABLE CLASS AND PATTERN TO PROVIDE SELECTIVE MUTABILITY IN COMPUTER PROGRAMMING ENVIRONMENTS

(75) Inventors: Greg D. Schechter, Seattle, WA (US); Joseph S. Beda, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 10/693,438

(22) Filed: Oct. 23, 2003

(65) Prior Publication Data

US 2005/0091637 A1    Apr. 28, 2005

(51) Int. Cl.
*G06F 9/45* (2006.01)
(52) U.S. Cl. .................. 717/144; 717/108
(58) Field of Classification Search .............. 717/144, 717/125, 126, 108
See application file for complete search history.

(56) References Cited

U.S. PATENT DOCUMENTS

| | | | | |
|---|---|---|---|---|
| 5,758,153 | A * | 5/1998 | Atsatt et al. ............ 707/103 R |
| 6,298,475 | B1 * | 10/2001 | Alcorn ..................... 717/118 |
| 6,401,101 | B1 * | 6/2002 | Britton et al. ........... 707/103 X |
| 2004/0006765 | A1 * | 1/2004 | Goldman .................. 717/116 |
| 2004/0189645 | A1 * | 9/2004 | Beda et al. ............... 345/473 |
| 2004/0189667 | A1 * | 9/2004 | Beda et al. ............... 345/619 |
| 2004/0194020 | A1 * | 9/2004 | Beda et al. ............... 715/502 |
| 2004/0233201 | A1 * | 11/2004 | Calkins et al. ........... 345/473 |
| 2005/0066059 | A1 * | 3/2005 | Zybura et al. ............ 709/248 |
| 2005/0091575 | A1 * | 4/2005 | Relyea et al. ............. 715/502 |
| 2005/0091576 | A1 * | 4/2005 | Relyea et al. ............. 715/502 |
| 2005/0140694 | A1 * | 6/2005 | Subramanian et al. ..... 345/619 |

OTHER PUBLICATIONS

Ostermann et al. Object Oriented Composition Untangled, 2001, ACM, p. 283-299.*

* cited by examiner

*Primary Examiner*—John Chavis
(74) *Attorney, Agent, or Firm*—Workman Nydegger

(57) ABSTRACT

A changeable pattern and implementation is presented in which types (used in programming environments and virtual machines) may be mutable as controlled by a programmer, and share many of the benefits of value types, without the drawbacks of value types. The changeable pattern provides flexibility for restricting the modifiability of the resultant uses of the values, as well as providing a means for providing notifications upon changes. In one implementation, a single set of changeable types is provided that derive from a common Changeable base class, and any type for which mutability is desired may derive from the Changeable class. Properties associated with the changeable define state that determines cloning and/or changeability characteristics on subsequent uses of the type. True mutability is provided via a status property of next use being set to a changeable reference state such that subsequent uses of the type do not cause a state change.

38 Claims, 11 Drawing Sheets

CHANGEABLE CLASS AND PATTERN TO PROVIDE SELECTIVE MUTABILITY IN COMPUTER PROGRAMMING ENVIRONMENTS

FIELD OF THE INVENTION

The invention relates generally to computer systems and computer programming.

BACKGROUND OF THE INVENTION

Programming environments and "virtual machines," including C, C++, C#, CLR (Common Language Runtime), Java, VB.NET, and so forth) typically present types of variables, including value types and reference types. Value types are variables that contain a value for an object. Value types are of fixed size, often allocated on the stack, and when passed between functions are copied in their entirety. However, there are significant restrictions on their use. For example, a subclass cannot be derived from a value type in some programming environments, and in any environment, a value-type cannot be treated polymorphically.

Reference types are variables in which the variable does not actually contain an object's bits, but rather contains a reference to the object's bits. Reference types are heap allocated, passed between function by passing pointers to the objects, and (at least in contemporary, dynamic programming environments) their memory is automatically managed through garbage collection.

For many programming APIs (application programming interfaces) that use reference types, it is very useful and efficient to be able to treat variables sent into them as immutable (or non-modifiable), and have the API make a copy of the variable when it is being sent into the API. The danger of not doing so is that any change to the variable that was sent into the API results in changes to its use, and those changes are often undesirable and cannot be handled appropriately. Note that value types do not have this problem, since value types are always copied on use.

However, programmers do not like the immutability requirement, and previous attempts to provide some mutable-like behavior have not been well received. By way of example, consider a graphics scene designer specifying via an API call that an object's (e.g., a button's) color is to appear red. To change the color at a later time, the designer needs to create a new object with the new color and replace the old object with it, because the old object is immutable. To this end, U.S. patent application Ser. No. 10/402,268, now U.S. Pat. No. 7,126,606, assigned to the assignee of the present invention and hereby incorporated by reference, describes a system and method in which resource objects in the system may utilize a builder pattern. In the builder pattern, immutable objects are created with a builder class, which is a companion class that is effectively mutable. The designer creates an immutable object to mirror the parameters set on the builder, creates a new builder for that object, and initializes it from the immutable object. The designer then changes the builder as necessary. Once done, the designer can build a new object, by changing the builder and reusing it to create another immutable object.

Although this solution works well, programmers do not like having to deal with the builder pattern, which requires use of a dual set of types. Moreover, programmers do not like the concept of immutability in general. Note that with immutable approaches, programmers are fundamentally unable to make changes deep in an object, which is a significant drawback. With the builder pattern or other approaches that maintain immutability, making a deep copy of the object, modifying it, and setting it back in is not very performant. As APIs and object models for more modern programming environments like the CLR and other contemporary APIs become more relevant, the drawbacks associated with such immutability become more significant.

SUMMARY OF THE INVENTION

Briefly, the present invention presents a "Changeable" pattern and implementation in which types may be mutable as controlled by a programmer, and share many of the benefits of value types, yet without the drawbacks of value types. The changeable pattern provides additional flexibility for restricting the modifiability of the resultant use of the values, as well as providing a means for notifying interested listeners when changes occur.

In one implementation, the present invention provides a single set of changeable types that derive from a common base class, e.g., Changeable. Any type for which the behavior of the Changeable class is desired may derive from Changeable. As requests directed to changeable classes are received, such as via function calls originated from an application program, a request handler including a state machine processes the requests and maintains state and object data via a supporting data structures. Based on the current property state of a type, certain requests result in cloning the data structure into a cloned copy with an appropriate property state.

A changeable object contains methods including Copy( ) and MakeUnchangeable( ). An explicit call to the Copy( ) method creates a copy of the changeable with the copy's IsChangeable property set to true. This call does not alter the object on which the method is called. The MakeUnchangeable( ) method may be called on any changeable, and modifies the IsChangeable property to make it false, (unless already false, in which case the call has no effect). Certain ways to use the object, each referred to as a qualified use, may change the state depending on the current property settings that define the current state.

To change a changeable object, the IsChangeable property value needs to be set to true. When true, a status property (StatusOfNextUse) related to the next qualified use determines the current state, and can be set to unchangeable, changeable copy or changeable reference. True mutability of the same type is provided, in that when the StatusOfNextUse property in the changeable reference state, a qualified use remains in the ChangeableReference state and the use does not make a copy. Note that true mutability also provided via the ChangeableCopy state, however the qualified use will make a copy, and that copy will be mutable, whereas the ChangeableReference does not make a copy.

The above mechanisms facilitate a pattern for replacing a property while substantially reducing the amount of copying required. In any state, the behavior of the Copy( ) and MakeUnchangeable( ) methods remain consistent, in which the Copy( ) method results in a new value object having the IsChangeable property of true and StatusOfNextUse property of Unchangeable, and the MakeUnchangeable( ) method results in the target value object having a IsChangeable property of false.

In general, upon receiving a request for a type, the type is created with a changeable property set to allow a change and a status property set to not allow a change following a next qualified use. On a next qualified use, the type is cloned with a changeable property set to not allow a change. A request to copy the type also causes the type to be cloned, the cloned type having a changeable property set to allow a change and a status property set to allow a change following a next qualified use. Upon receiving a request to copy the cloned type, the cloned type is cloned into a second cloned type having a changeable property set to allow a change and a status property set to not allow a change following a next qualified use.

When a request to set the type to not allow a change is received, the type is changed so as to have the changeable property set not allow a change. Upon receiving a request to copy the type when in this state, the type is cloned with a changeable property set to allow a change and a status property set to not allow a change following a next qualified use.

Upon receiving a request to modify the status property to allow a changeable copy the type's the status property is set to a state in which the type is cloned following a next qualified use, with the cloned type having a changeable property set to allow a change and a status property set to not allow a change. Upon receiving a request to modify the status property to allow a changeable reference, the type is caused to have the status property set to allow a change following a next qualified use; a notification of the change upon the next qualified use may be provided.

In one aspect, mutability is achieved via a type that is provided that is capable of being in a state in which a changeable property allows a change, and a status property specifies that the type is a changeable reference. In this state, upon receiving a request to change data of the type in a qualified use, the change is allowed, and the type is left in the same state. A notification of the change may be provided. Upon receiving a request to modify the status property to a changeable copy the type enters another state in which, upon another qualified use, a cloned type is made having a changeable property set to allow a change and a status property set to not allow a change following a subsequent qualified use.

To this end, a status property setting (StatusOfNextUse) determines how the next qualified use is going to occur. If unchangeable, the type will not be modifiable. If ChangeableCopy or ChangeableReference, the next qualified use will be mutable, however ChangeableCopy will have the qualified use be to a new copy, whereas ChangeableReference will be the same type.

Other advantages will become apparent from the following detailed description when taken in conjunction with the drawings, in which:

DETAILED DESCRIPTION

Exemplary Operating Environment

Figure 1:
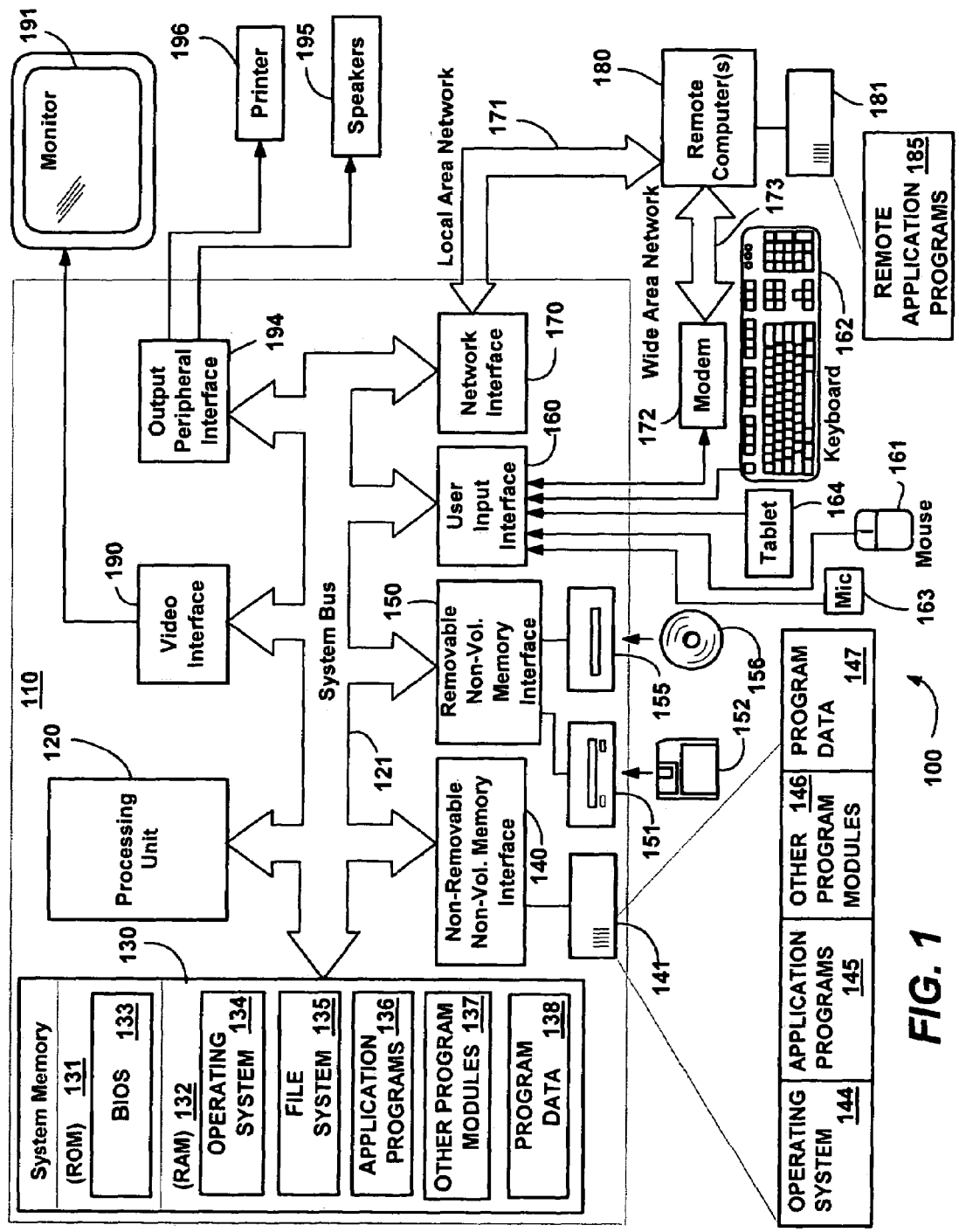
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The Changeable Pattern

For purposes of explanation, the present invention will primarily be described in the context of a programming environment in which example objects in a graphics scene are constructed, used and modified. However, as will be understood, although the present invention provides significant benefits in graphics-related programming environments, the present invention is not limited to graphics-related programming environments, but more generally applies to many other types of programming environments.

In one implementation, the present invention provides a single set of types that derive from a common base class, e.g., System.Windows.Changeable. Any class can be mutable, by deriving from the Changeable class and thereby obtaining the value-type semantics that the Changeable offers. For example, in a graphics programming, the object model includes Brushes, Pens, Geometries, FloatAnimations, GradientStops, Segments, and so forth, as generally described in the aforementioned U.S. patent application Ser. No. 10/402,268. For example, the hierarchy for a drawing brush may be something like:

Object:Changeable:Animatable:Brush:TileBrush:Drawing-
Brush.

For purposes of basic usage, a changeable object includes the following property and methods:

```
public class System.Windows.Changeable
{
    public bool IsChangeable { get; } // defaults to true
    public Changeable Copy( );
    public void MakeUnchangeable( );
}
```

The IsChangeable property specifies whether the changeable object can be modified or not, depending on its current value. For example, an attempt to set the opacity property of a brush will only succeed if that brush object has the IsChangeable property equal to true. Otherwise, an exception will be raised. When constructed, changeable objects have the IsChangeable property equal to true by default, and are thus immediately modifiable.

Figure 2:
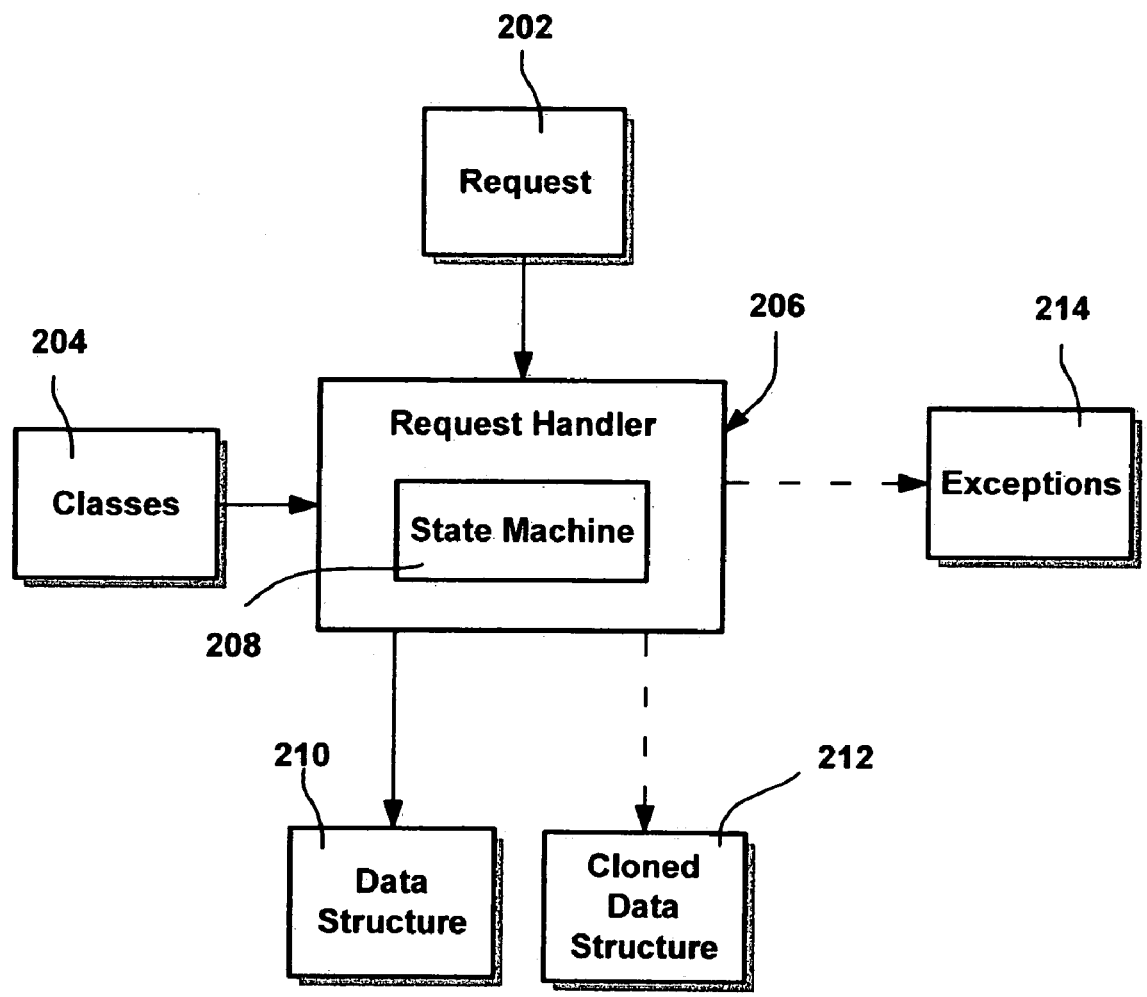
FIG. 2 is a block diagram generally representing an architecture in which requests are processed by a state machine to control a type's mutability, in accordance with an aspect of the present invention.

As represented in FIG. 2, requests 202 are received, such as via function calls originated from an application program, that are directed to changeable classes 204. In general, a request handler 206, including a state machine 208, processes the requests and maintains state and object data via a supporting data structure 210, cloning the data structure in a cloned copy 212 with an appropriate property state, based on a current property state, as described below. Exceptions 214 may be thrown, such as when the request seeks a transition that is not allowed from within a current property state. The property states are described below with reference to FIGS. 3–5.

It should be noted that the function calls directed to changeable classes may be handled directly or indirectly. For example, the request handler 206 in FIG. 2 may include an API set that provides the interfaces to the state machine. Alternatively, the request handler 206 may comprise middleware code that converts the requests received in one operating system to API calls handled by another operating system. Thus, as used herein, the requests, via the request handler, "cause" the requested behavior to occur, regardless of where the actual state machine processing occurs or where the data structures and classes are provided.

In this manner, (among other mechanisms), applications may construct changeable objects via a "new" request, set values into them, use them, continue setting values into them, and continue using them.

The following is an example of how an application creates a brush of a solid color (scb), modifies the brush to have a solid color (red) and uses the brush to color a button's background red:

```
SolidColorBrush scb = new SolidColorBrush( );
scb.Color = Colors.Red;
Button1.Background = scb;   // this qualifies as a "use" (as
                            // described below)
```

The notion of "using" a value has a specific meaning, that is, values are only considered to be used under certain conditions. These conditions include when a value is set into a Property System property, when a value is used as a sub-object in a more complex changeable, and when a value is used in a DrawingContext command or the like. Note that system extenders can easily define other instances of using a changeable object that qualifies as a "use" and modifies the changeable state of the object.

When a value is used in one of these qualified kinds of uses, from the user-model perspective, a clone of it is made, and that clone has its IsChangeable property set to false. Note that in actuality, a clone is not necessarily created, and when one is created, it is not necessarily deep (within the object hierarchy, as described below). Notwithstanding, from the perspective of a model, it is appropriate consider a clone being made, and thus as used herein, the concept of a "clone" covers a clone that is actually created, a clone that is created in part, and/or a clone that is logically created from the model's perspective even though not necessarily created. The clone is what actually gets used, and, by default, the clone cannot be modified.

As shown above, a changeable object also contains methods including Copy( ) and MakeUnchangeable( ). An explicit call to the Copy( ) method creates a copy of the changeable with the copy's IsChangeable property set to true. This call does not alter the object on which the method is called. The MakeUnchangeable( ) method may be called on any changeable, and modifies the IsChangeable property to make it false, (unless already false, in which case the call has no effect).

The above mechanisms facilitate a pattern for replacing a property. To change a changeable object, the IsChangeable property value needs to be true. Since a qualified use of an object creates a clone that is not changeable, that object needs to be copied out via the Copy( ) method, changed, and used again. This is effectively replacing the initial object that was present with a new object that is a modified copy of the original. Examples of this are set forth below. Note that an in-use changeable is one that has been used, and thus by the definition above, is not changeable because the IsChangeable property is set to false upon use. Thus, the changeable is not modified, but rather a changeable is copied out and replaced. Note that to an extent, this aspect is somewhat similar to the aforementioned builder usage model, however with changeables, there is only a single set of types, which is generally far more desirable from a programming perspective. Further, true mutability is provided by additional properties, as described below.

As described above, it is straightforward to create a brush, modify it and use it. An example of a simple use in a drawing operation is set forth below:

```
SolidColorBrush scb = new SolidColorBrush( );
scb.Color = Colors.Red;
ctx.DrawRectangle(scb, ...); // this is a "use"
scb.Color = Colors.Green;
ctx.DrawRectangle(scb, ...); // this is a "use"
```

Executing the above instructions draws one red rectangle, and one green rectangle. Note that 'scb' is, in effect, cloned on each usage of it.

A more complex construction using a linear gradient brush (lgb), in which colors vary (e.g., linearly) from one stop to another, is set forth below:

```
LinearGradientBrush lgb = new LinearGradientBrush( );
GradientStop gs1 = new GradientStop(Colors.Red, 0.3);
GradientStop gs2 = new GradientStop(Colors.Blue, 0.2);
lgb.Stops.Add(gs1);   // this is a "use" of gs1
lgb.Stops.Add(gs2);   // this is a "use" of gs2
Button2.Background = lgb;   // this is a "use" of lgb
```

Here, the process is building values (GradientStops) and using them in definitions of more complex values.

Consider another example directed towards changing the opacity (which can range from zero to one) of a button's (Btn) background to 0.4. In this particular usage, the Background is copied into an object with IsChangeable property set to a true value, the background is modified, and set back in.

```
Brush b = Btn.Background.Copy( ); // get IsChangeable copy
b.Opacity = 0.4;
Btn.Background = b; // "use" modified value
```

Note also that the assignment to "Btn.Background" in the last line severs any inherited or property sheet value that might have come in.

Modifications that are deeper within the object hierarchy appear no different to the user than modifications that are shallow:

```
Brush b = Btn2.Background.Copy( );
LinearGradientBrush lgb = (LinearGradientBrush)b;
lgb.Stops[1].Color = Colors.Green;
lgb.Stops[0].Location = 0.2;
Btn2.Background = b;
```

Note that Copy( ) only needs to be called on the top level object, and not on the individual GradientStops. This is because the system takes care of ensuring that sub-objects of an object with a true IsChangeable property are themselves set with IsChangeable equal to true when they are accessed. Further note also that this "replacement" model is similar to how the Builder pattern works, however being a Builder (e.g., being IsChangeable equal to true) is a runtime concept, and is not reflected via different types.

Figure 3:
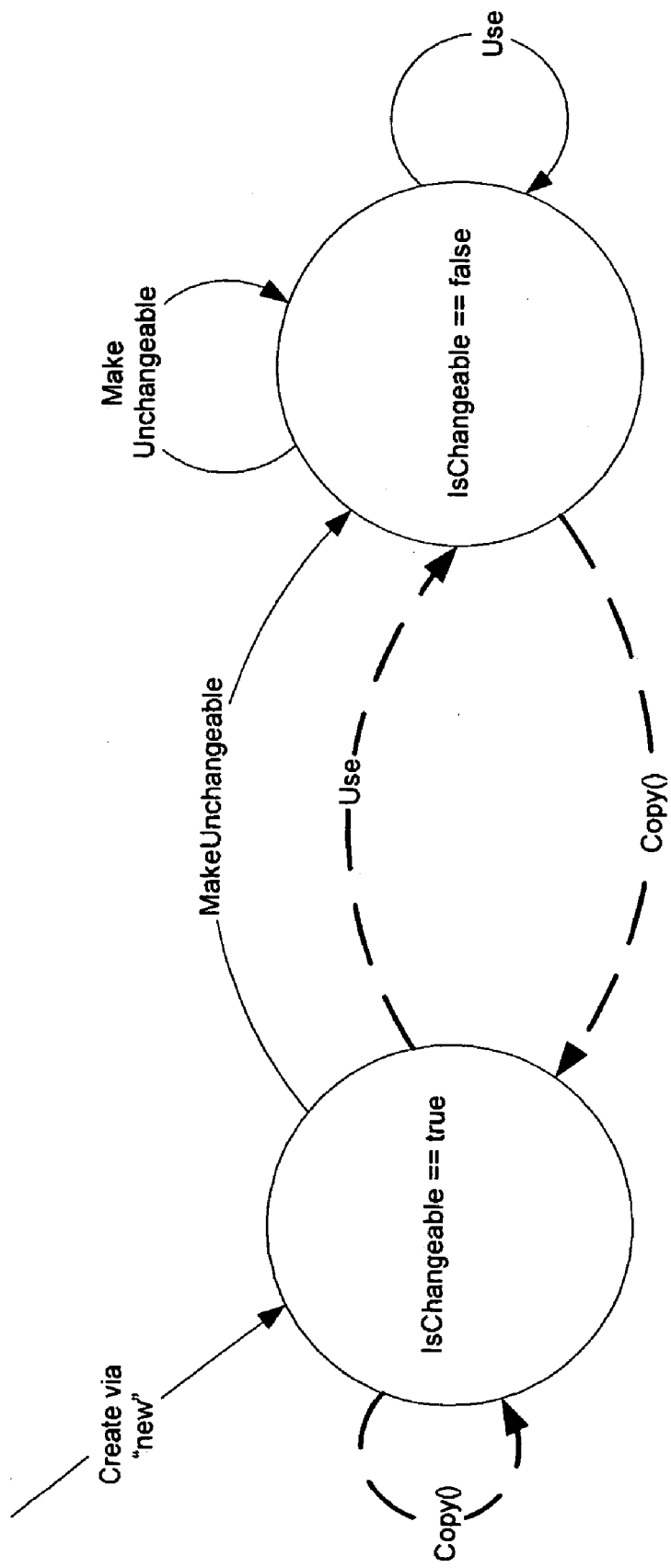
FIG. 3–5 are state diagrams representing how property states control the behavior of mutable types, in accordance with an aspect of the present invention.

FIG. 3 shows a state diagram representing the states of a changeable object in basic usage, beginning with IsChangeable property equal to true when newly created. In general, the solid arrows show the states of the object transitioning from a current state to a target state, while any dashed arrow represents an operation that leaves the object the same, but creates a new object in the target state. In this state diagram, there are two states, and the transitions occur when either Copy( ) or MakeUnchangeable( ) are called, and when an object is used in a manner that qualifies as a use, as described above. Note that calling the Copy( ) method from either state results in a new value with its IsChangeable property set to true, while calling MakeUnchangeable( ) results in the target value being IsChangeable set to false.

The above description presents a straightforward, self-consistent model, that describes the basic usage with just two states, Copy( ) and MakeUnchangeable( ) methods, and the notion of "using" a Changeable value. However, with respect to changes, the modification examples above are based on the concept of replacement, that is, copying an existing item, changing it in place, and copying it back. This implies heap allocation (which may be potentially significant, depending on how deep the change to be made is, and how broad the object itself is for the shallow clones), as well as an additional burden on the programmer to maintain some mechanism to find the path to the attribute to modify.

In accordance with an aspect of the present invention, to add support for the concept of true mutability of values, another property is added to the model, named StatusOfNextUse of type UseStatus. Note that a fundamental issue preventing mutability in the single property model is that a qualified use of a value unconditionally results in the resultant value with the IsChangeable property equal to false. The StatusOfNextUse property resolves this issue.

```
public enum System.Windows.UseStatus
{
    Unchangeable,
    ChangeableCopy
}
```

By default, the StatusOfNextUse property is UseStatus.Unchangeable, but may be set to UseStatus.ChangeableCopy, whereby a use of the value on which it is set will result in a clone object being made that has the IsChangeable property set to true. As a result, the object value can be modified in-place, without any additional heap allocation.

Further, because in-use values can be mutated in this model, a notification is provided when such changes happen, via a simple changed event. Furthermore, since the object is no longer immutable, context-affinity is provided through a UIContext member. Note that when the object is mutable, this has a null value. Otherwise it belongs to the UIContext in which it was created. The resultant Changeable class definition becomes:

```
public class System.Windows.Changeable
{
    // Carryover from "basic usage" above
    public bool IsChangeable { get; } // defaults to true
    public Changeable Copy( );
    public void MakeUnchangeable( );
    // New members
    public bool CanMakeUnchangeable { get; } // will
                                 // MakeUnchangeable succeed?
    public UseStatus StatusOfNextUse { get; set; } // defaults
                                                // to Unchangeable
    public event EventHandler Changed { add; remove; }
    public UIContext UIContext { get; } // null when immutable
}
```

The above example of simple, shallow mutability described the requirements to change the opacity on a Brush, with the code needing to run each time opacity was to be changed. In contrast, with the mutability mechanism based on the StatusOfNextUse property, first the Btn.Background itself has an IsChangeable property value of true:

```
Brush b = Btn.Background.Copy( ); // get IsChangeable copy
b.StatusOfNextUse = UseStatus.ChangeableCopy;
Btn.Background = b;
```

The above has used (in a qualified use) a value with StatusOfNextUse of UseStatus.ChangeableCopy, so the result itself is changeable. Once set up, the programmer can make modifications as desired, as in the following example:

```
Btn.Background.Opacity = 0.3;
```

The programmer can make such modifications as often as desired, and the modification will happen directly, without any object allocation on subsequent settings.

Note that the above example does not describe how the Btn.Background came into being in the first place, and thus a copy of it needs to be made via the Copy( ) method. In a deliberate mutability situation where the programmer wants to create a background to be modified, a better way to do this might be directly, as in the following example:

```
SolidColorBrush b = new SolidColorBrush( );
b.Color = Colors.Red;
b.StatusOfNextUse = UseStatus.ChangeableCopy;  // set this up
                                               // directly
Btn.Background = b;
```

At this point, the programmer can specify the opacity (Btn.Background.Opacity= . . . ) whenever desired, as the brush was created initially as StatusOfNextUse equal to UseStatus.ChangeableCopy.

It should be noted that using the replacement-based model rather than the mutating-based model is not particularly difficult given the above examples. This is because the changes are made at the first level, and it may not appear prohibitively expensive to always replace rather than mutate. Indeed, this is valid technique when only limited mutability is desired. However, when changes are made to values deeper an object, the mutating model is clearly superior.

As an example of such deeper mutability, consider the LinearGradientBrush (lgb), wherein the programmer repeatedly wants to change the color of the seventh stop (lgb.Stops [6]). The programmer can use the same instructions as above to install a mutable version into Btn.Background:

```
Brush b = Btn.Background.Copy( ); // get IsChangeable copy
b.StatusOfNextUse = UseStatus.ChangeableCopy;
Btn.Background = b;
```

Thereafter, the programmer can repeatedly make the desired changes:

```
LinearGradientBrush lgb =
    ((LinearGradientBrush)Btn.Background);
lgb.Stops[6].Color = ... some new color ...;
```

The programmer can also access the "lgb" variable once, store it away, and then repeatedly set into it, which is very efficient.

Figure 4:
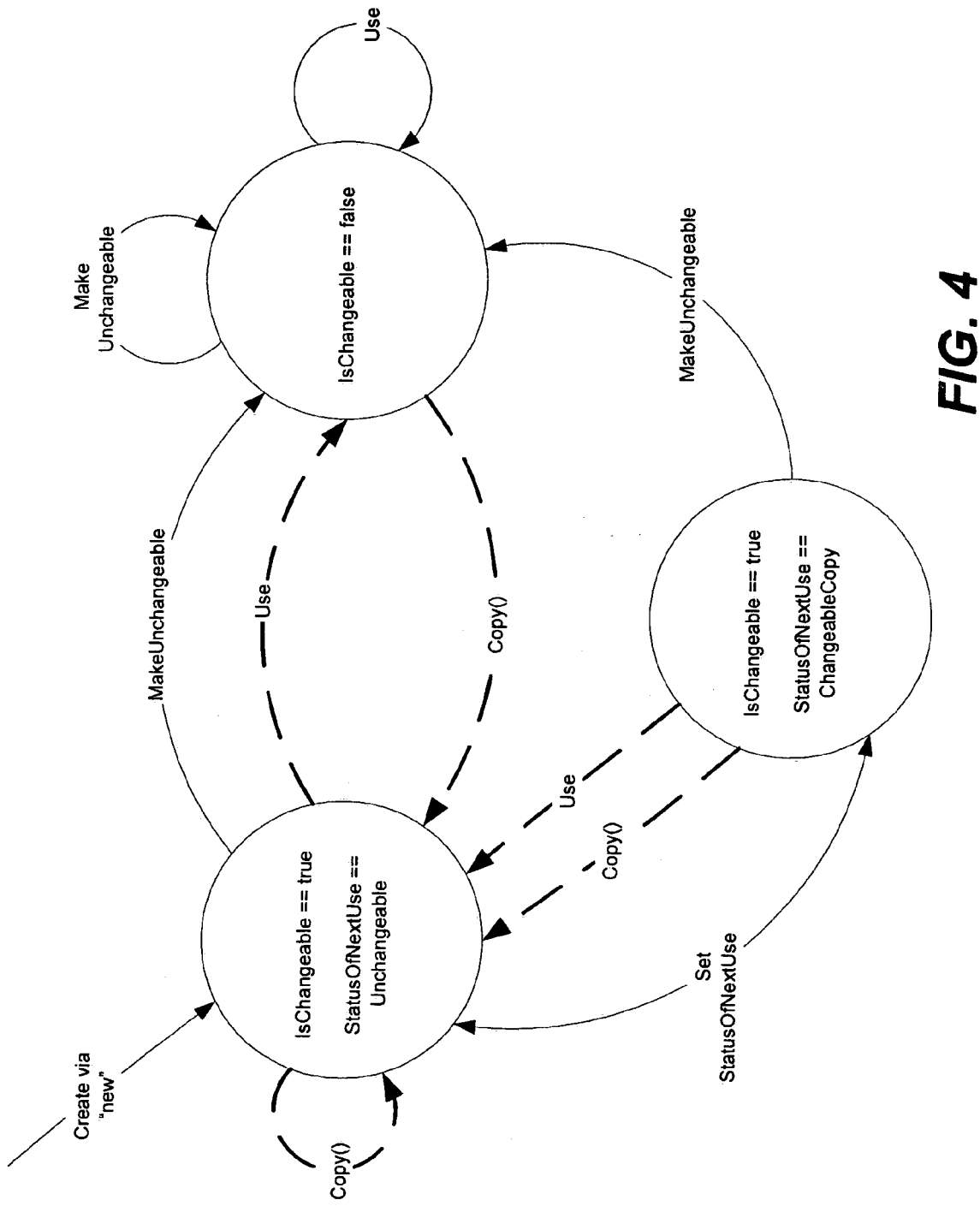

FIG. 4 is an extension of the state diagram of FIG. 3 with the additional state represented by the StatusOfNextUse property added. Note that the model is only slightly more complicated, as the basic state diagram of FIG. 2 has two states and seven transitions, whereas the mutability state diagram has three states and eleven transitions. As can be seen from FIG. 3, a significant addition is the (StatusOfNextUse ==ChangeableCopy) state, and the "Use" transition out of that state, which results in a new copy with the IsChangeable property value set to true.

As in FIG. 3, calling the Copy( ) method results in a new value with an IsChangeable property equal to true, with the StatusOfNextUse property set to Unchangeable. Similarly, the MakeUnchangeable( ) method call results in the target value for the IsChangeable property set to false. Note that even though flexibility has been added via the mutability, these constants have not changed.

There are some situations where use as StatusOfNextUse equal to ChangeableCopy will not be allowed, because subsequent modifications are truly not well-defined, or are explicitly disallowed. Examples of this include attempting to modify values in a shared default style sheet, or setting non-local property engine properties. In such situations, the subsystems that disallow such use will either choose to raise an exception, or make the value unchangeable themselves. It is recommended that an exception be raised as a more clear indication to the programmer of what has occurred and thereby avoid later confusion.

Further, there are situations in which a changeable object cannot be made unchangeable. Examples include a VisualBrush, (as described in the aforementioned U.S. patent application Ser. No. 10/402,268), in which the underlying visual can not be restricted from changing, and therefore it would be nonsensical to state that the VisualBrush is "unchangeable." Animations and VideoData (because they are time varying) are also examples. Attempts to call MakeUnchangeable( ) on such objects will raise exceptions, or worse, may leave the object in a bad state, as portions of it may have been made unchangeable while others have not. These problems cam be avoided via another property, CanMakeUnchangeable. If this property returns a "true" value, then MakeUnchangeable( ) is guaranteed to succeed, provided no changes to the object happen between these calls.

There is a conflict in semantics that occasionally occurs between StatusOfNextUse and CanMakeUnchangeable. If CanMakeUnchangeable equals false, then a value of UseStatus.Unchangeable for StatusOfNextUse really does not make sense, as the next use cannot be unchangeable. Therefore, when StatusOfNextUse is queried when CanMakeUnchangeable equals false, it never will return UseStatus.Unchangeable. Instead, when it otherwise would have returned UseStatus.Unchangeable, it returns UseStatus. ChangeableCopy.

The above presents a model where every (qualified) use of a changeable (IsChangeable equals true) object results in a copy of that object being made, and, depending on the value of StatusOfNextUse, that "use" may or may not itself by changeable. What the above model does not provide is the use of a value in multiple places, and maintaining a shared reference to that value. For example, in the above model a programmer cannot create a LinearGradientBrush, use it on two Button controls, and then change the LinearGradientBrush once to affect both controls. Rather the programmer would need to use it twice, get the brush back out of the controls, and then set each one independently. In general, this model turns out to be the most expected and/or least surprising to programmers, but there are scenarios where additional functionality is desirable.

One such scenario is in Animation, where, if a programmer wants to create a scene with n elements that each respond to the same timeline, that timeline needs to be cloned n times, and asked to BeginIn( ) n times. A much better approach, from both a performance and efficiency point of view, as well as for programming model convenience, is to share out a reference to a single timeline, invoke BeginIn( ) on it, and have it propagate as appropriate.

To enable this scenario, a third value, ChangeableReference, is provided with the UseStatus enumeration. UseStatus now looks like:

```
public enum System.Windows.UseStatus
{
    Unchangeable,
    ChangeableCopy,
    ChangeableReference
}
```

When a changeable object that has StatusOfNextUse set to UseStatus.ChangeableReference is used (in a qualified manner), that value is no longer copied. Rather, a reference to the existing value is handed out, and subsequent modifications to that value (or any previously or subsequently handed out references) will affect the result of the use. In other words, the changeable value is now shared with potentially any number of uses.

The following is an example of element level usage:

```
Brush b = new SolidColorBrush(...);
b.Color = Colors.Yellow;
b.StatusOfNextUse = UseStatus.ChangeableReference;
Btn1.Background = b;
Btn2.Background = Btn1.Background;
Btn3.Background = Btn2.Background;
Btn4.Background = b;
// at this point, all four buttons are yellow
((SolidColorBrush)Btn3.Background).Color = Colors.Purple;
// They change to purple, and they are notified.
```

In an above example, a simple drawing operation was described which generated two rectangles, one red, and one blue:

```
SolidColorBrush scb = new SolidColorBrush( );
scb.Color = Colors.Red;
scb.Color = Colors.Green;
ctx.DrawRectangle(scb, ...); // this is a "use"
```

This is the desired behavior. However, if a programmer instead wanted the brush to be shared, and still be changeable, the following instructions could be used:

```
SolidColorBrush scb = new SolidColorBrush( );
scb.UseResult = UseResult.ChangeableReference;
scb.Color = Colors.Red;
ctx.DrawRectangle(scb, ...); // this is a "use"
scb.Color = Colors.Green; // initial rectangle becomes green
ctx.DrawRectangle(scb, ...); // this is a "use"
```

Here, both rectangles are green. If later the color is changed, e.g., scb.Color=Colors.Yellow, both rectangles will become yellow. Note that ctx.DrawRectangle( . . . ) appears to be an immediate mode drawing command, however it is actually building a display list/metafile to be retained and subsequently displayed.

From a user-model point of view, the ChangeableReference mode guarantees that the parties that are using a changeable object will be notified of any changes to that value. This will be done through the "Changed" event which, like other events, is a multicast delegate. To implement, the system need to be sure that multiple uses with a single notification sink do not notify that sink for each use. Further, cleanup mechanisms have requirements when removing items, so as to only remove a sink when the uses connected to that sink are gone. One approach for doing this is to reference count delegates. The current implementation may achieve these requirements via a private data structure, e.g., RefCountedMulticastEventHandler.

Figure 5:
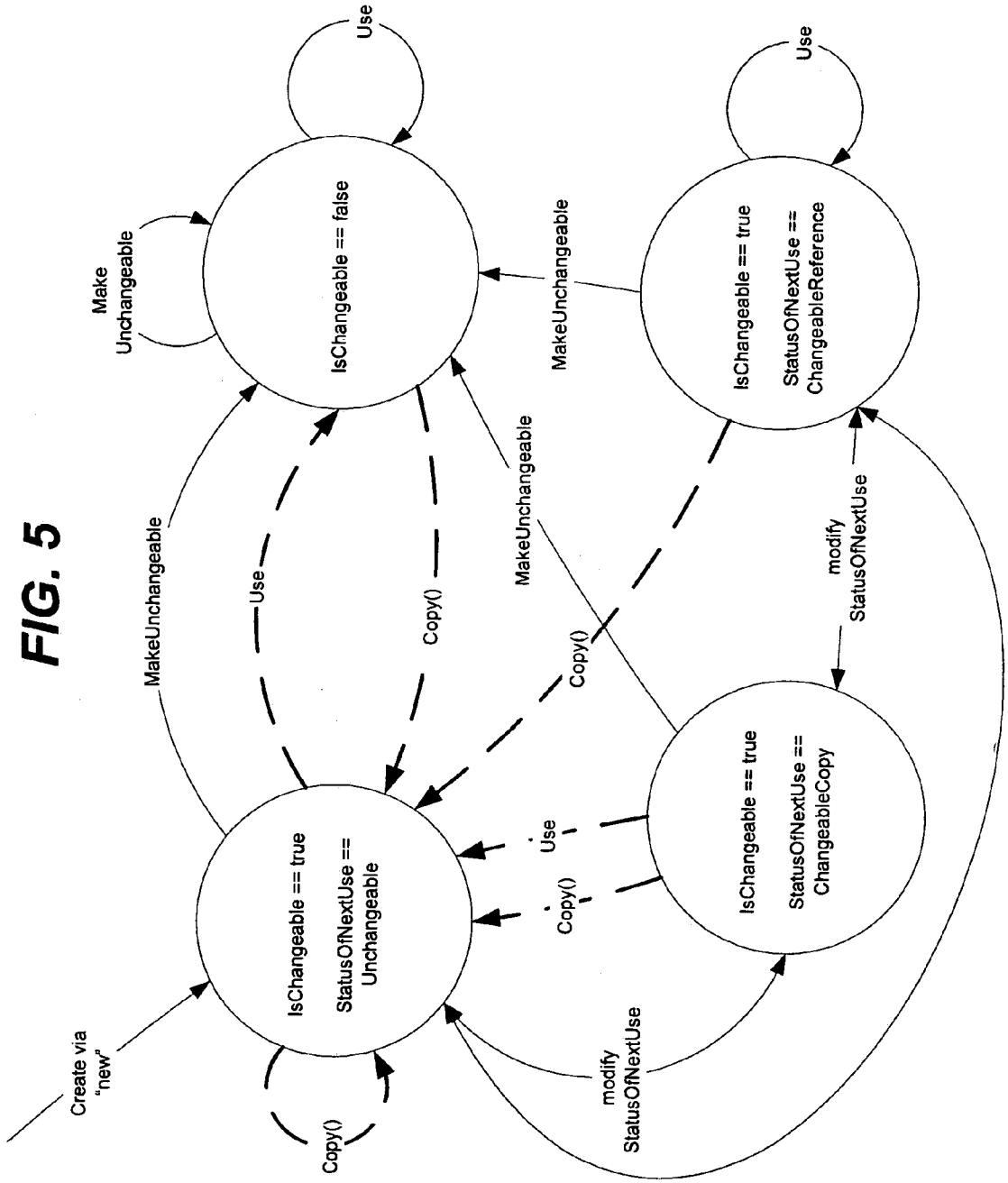

FIG. 5 is a state diagram based on FIGS. 3 and 4 but having a ChangeableReference state (via another setting in the StatusOfNextUse property) added. Note that in keeping with an aspect of the present invention, the ChangeableReference state and the Use transition off of that node does not make a copy. Rather, a qualified use results in the status of next use property remaining in the changeable reference state, thereby providing true mutability. Further, note that while FIG. 5 is more complex than those of FIGS. 3 and 4, the behavior of the Copy( ) and MakeUnchangeable( ) methods remain constant; the Copy( ) method still results in a new value object having the IsChangeable property of true and StatusOfNextUse property of Unchangeable, and the MakeUnchangeable( ) method still results in the target value object having a IsChangeable property of false.

It should be noted that along with the advantages of a single set of types, the present invention provides significant flexibility to programmers. For example, most values constructed by an application ordinarily will not be mutable, as immutable values are consume less resources. However, as described above, mutability is available, giving programmers a powerful and intuitive way to change values, particularly deep values, with high performance. Note also that although not represented in FIG. 5, the state in which a new type is created (the IsChangeable property of true, the StatusOfNextUse property of Unchangeable) is only one possible default state. Thus, in alternative implementations, the type may be in another state following creation, e.g., the IsChangeable property of true, the StatusOfNextUse property of ChangeableReference) such as to default to mutable values.

Turning to an explanation of the operation of the present invention, the present invention provides significant advantages when dealing with deep properties of an object, referred to as dotting-down. For example, consider the following:

```
GeometryList g;
g.Geometries[12].Figures[2].Segments[0].Points[17] =
    new Point(0.2, 0.3);
```

The deep access into the geometry object 'g' is an example of what is referred to as dotting-down. Note that the access to the properties (Geometries, [12], Figures, [2], Segments, [0], and Points) are calling property getters, not setters; [17] is the only property access that results in a setter being called. Programming languages generally cannot distinguish between access to a property for the sake of setting a property value deeper down versus access for reading a value deeper down.

When dotting-down starts from an unchangeable object, the local member variable is accessed. An example includes accessing an element that has not been made changeable through use of the "ChangeableValue" property.

When a property get happens from a changeable object, the resultant value is changeable as well, so that it can be mutated. To this end, the property getter on the parent returns the sub-object directly if already changeable, or makes a shallow clone of the sub-object, sets that into the local member, and returns that clone. Note that these attributes make the above code, after running the first time and allocating and assigning shallow clones, free in terms of not requiring heap allocation.

An aspect of the present invention is that on-demand, shallow cloning is performed only when necessary. This maximizes sharing, minimizes heap allocation, allows for modifications without heap allocation, and does not force the concept of cloning onto the user model. This becomes more important with deeper trees, and when working in three dimensions. To this end, the Copy( ) method provides the illusion of a deep copy, but really first only makes a shallow copy, and then lazily makes deeper copies as necessary. Such dotting-down provides significant performance improvements.

In accordance with an aspect of the present invention, another property on the changeable (generally invisible to applications) is that a changeable has a changed event (of type EventHandler). When a property of a Changeable changes, a Changed delegate on that changeable gets invoked, with the changing changeable as the sender. The act of making a shallow clone through dotting-down pushes the changed event handlers down into the shallow clone. This allows subsequent changes to occur on deeper elements and have the proper event handlers set up. Note that the Changed event also exists so that clients other than the property system can use this system and register for notifications.

Modifications to a changed event handler propagate down to sub-objects. In addition, modifications to a changeable itself involving other changeables (e.g., adding a changeable sub-object to a changeable object, removing one, and so forth) results in the containing changeable's event handlers being removed from the old ones and pushed into the new ones, recursively.

FIGS. 6–11 demonstrate how shallow-cloning and dotting down works, based on the following code for this example:

```
LinearGradientBrush lgb = new LinearGradientBrush( );
lgb.Stops.Add(new GradientStop(Colors.Red,0.3));
lgb.Stops.Add (new GradientStop(Colors.Blue,0.2));
lgb.Stops.Add (new GradientStop(Colors.Green,0.1));
Btn1.Background = lgb;
Btn2.Background = lgb;
```

Figure 6:
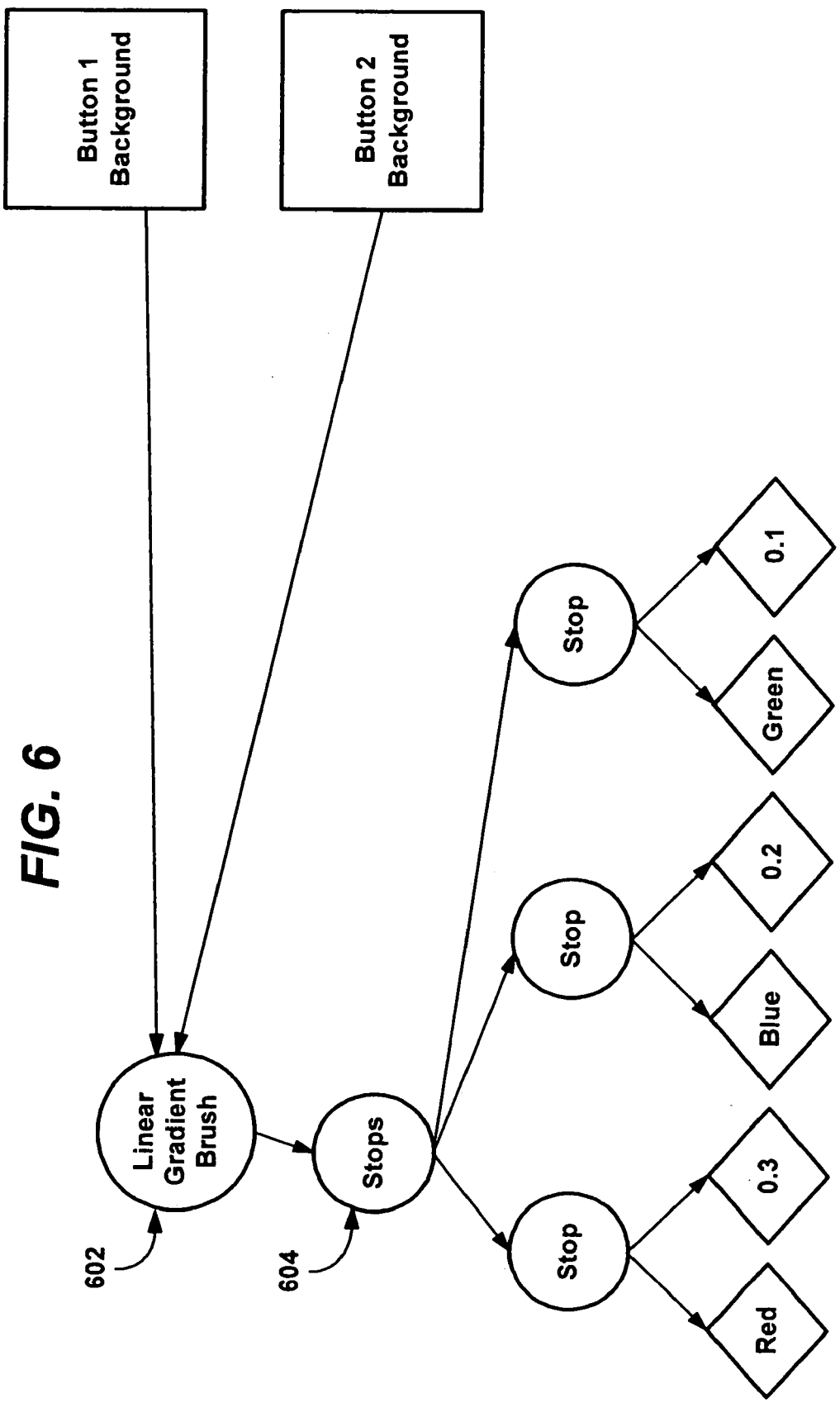
FIG. 6–11 are hierarchical representations of objects in an example scene graph showing how the properties control state transitions and cloning behaviors for example code, in accordance with an aspect of the present invention.
Figure 7:
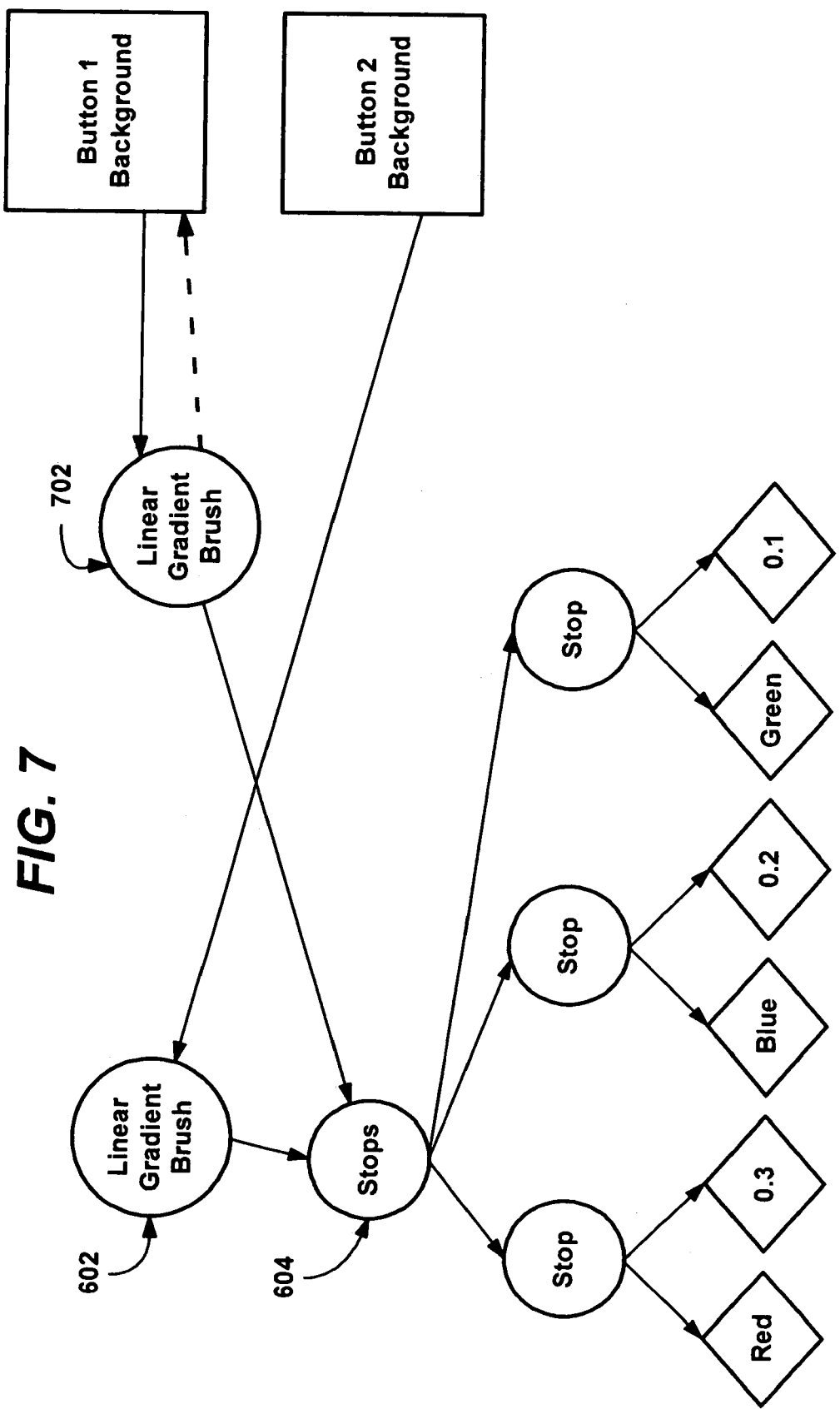

As shown in FIG. 6, both Button1 and Button2 point to the same linear gradient brush 602, which has a stops node 604 and the color and position properties for the specified stops arranged hierarchically below. Consider the code:

Btn1.Background.=Btn1.Background.Copy( );

Executing this code results in a copy 702 of the linear gradient brush 602 being made and pointed to by Button1, as shown in FIG. 7.

Figure 8:
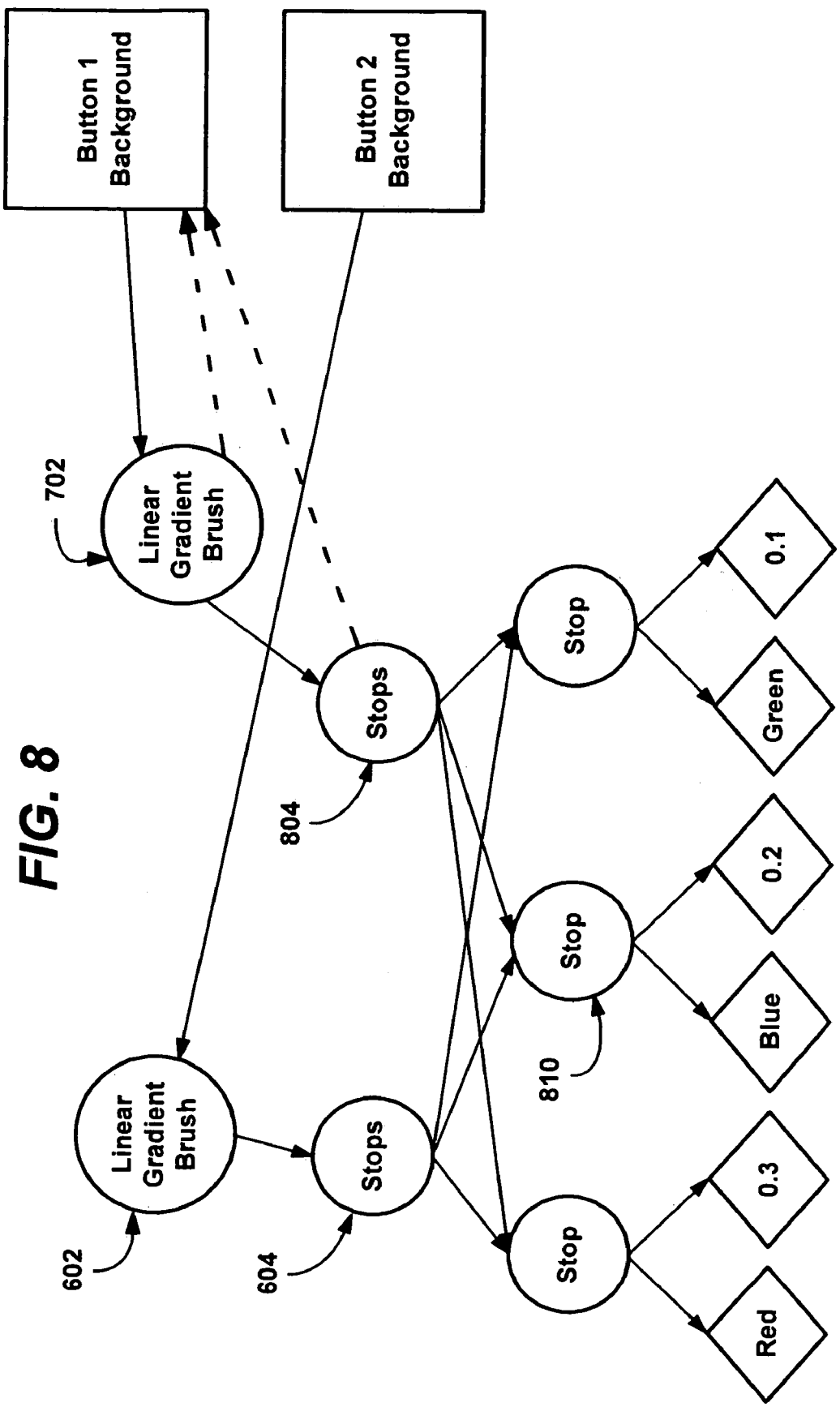
Figure 9:
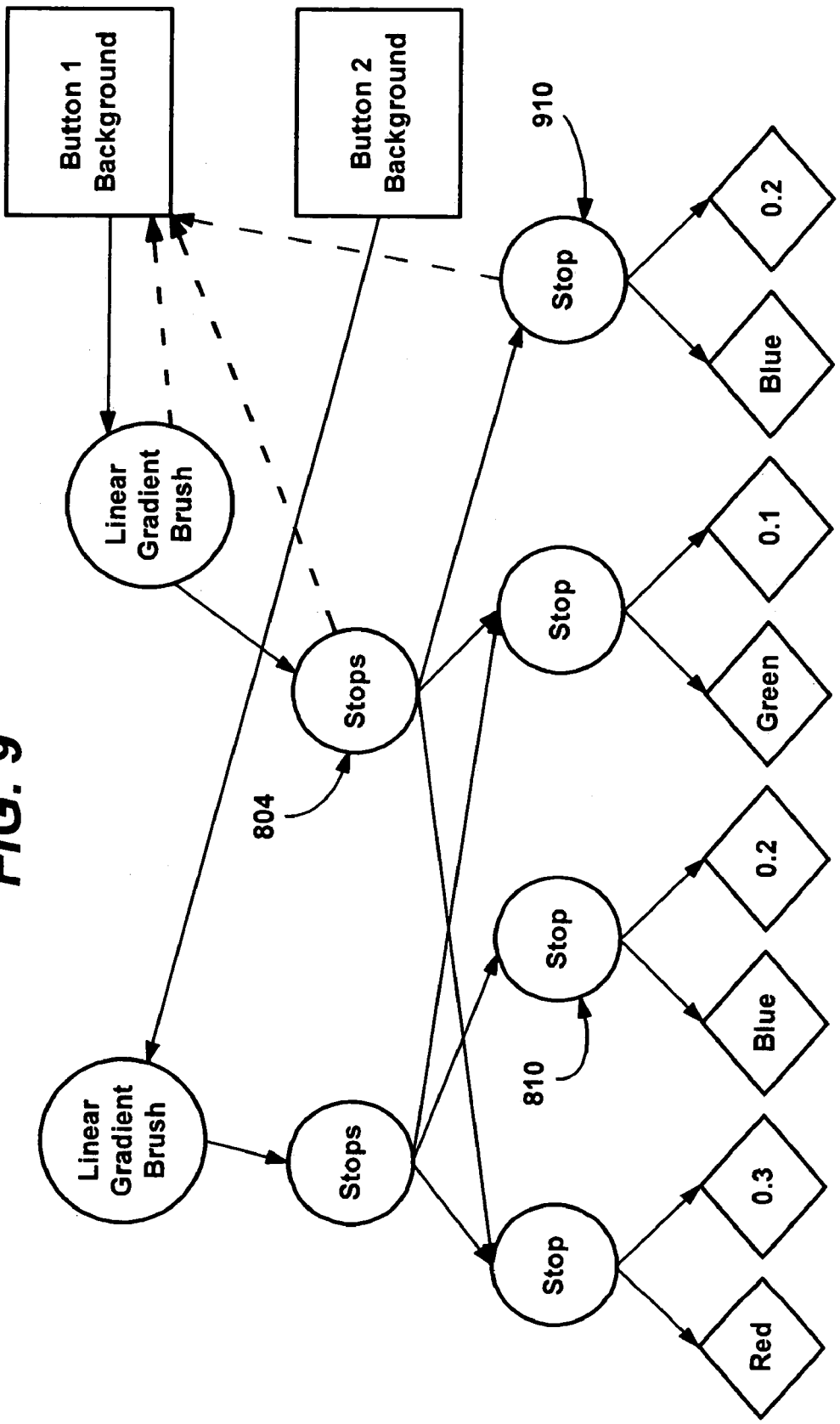
Figure 10:
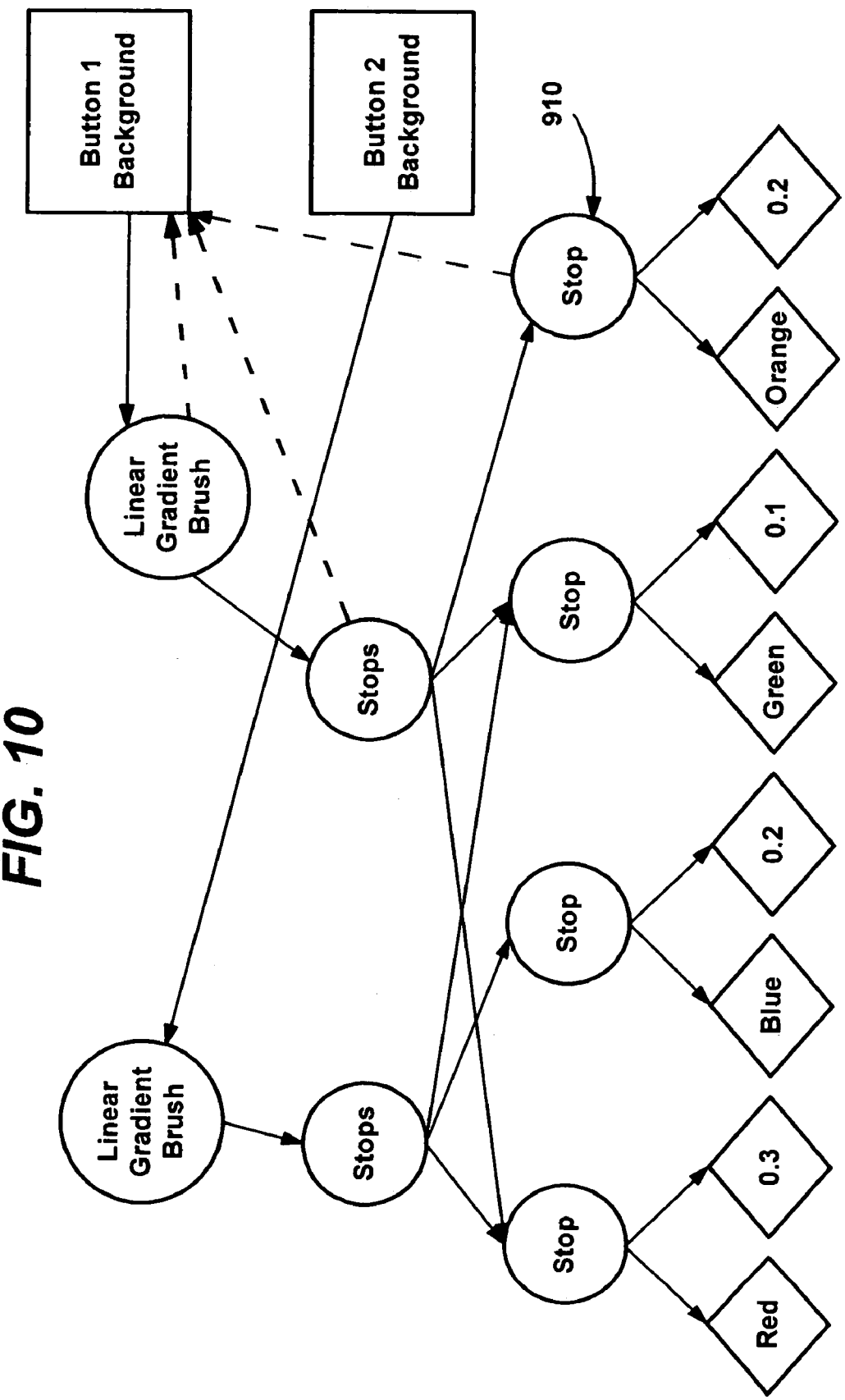
Figure 11:
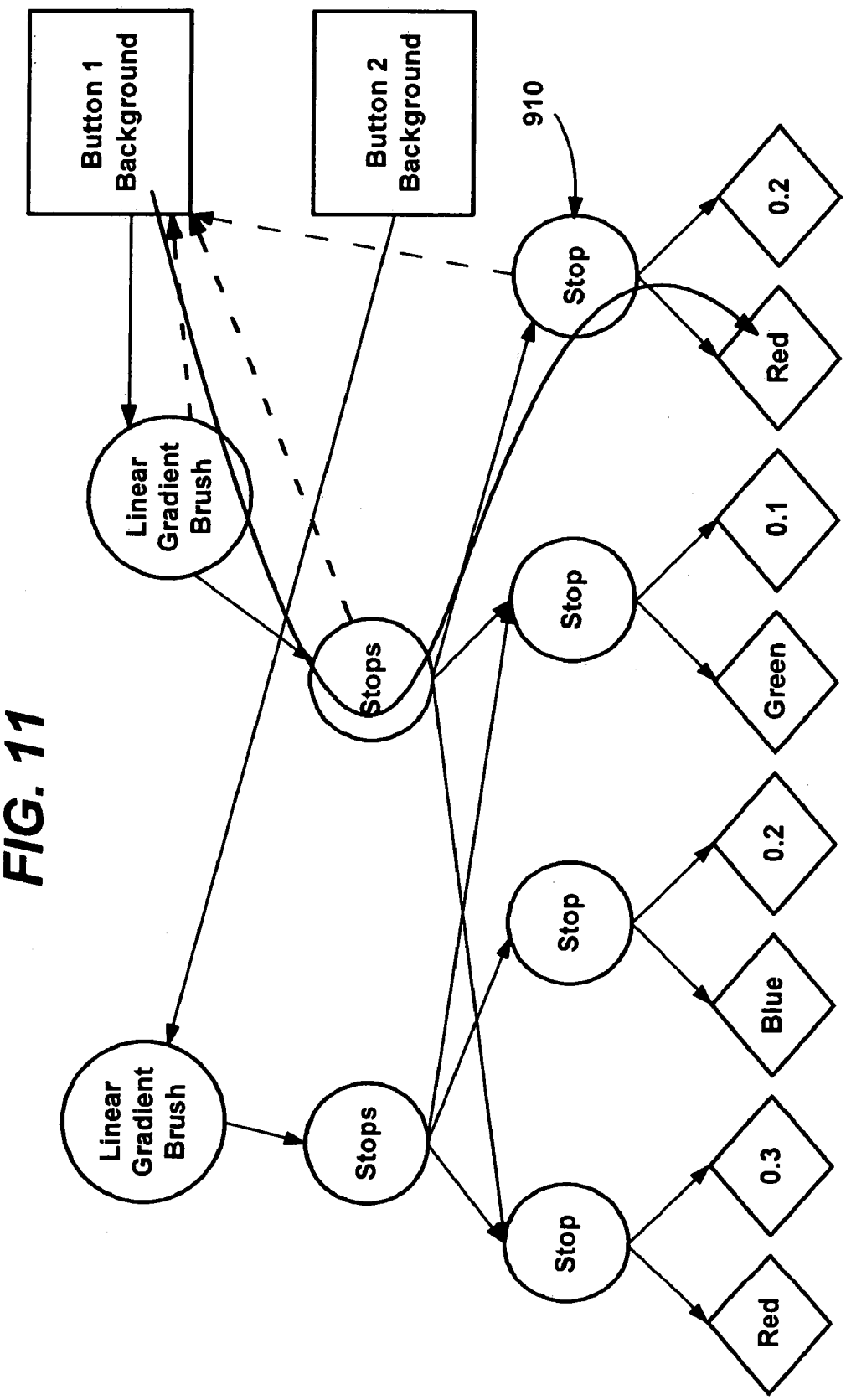

Executing the code:

LinearGradientBrush lgb=((LinearGradientBrush) Btn1.Background);

lgb.Stops[1].Color=Colors.Orange;

provides access to a Changeable-valued property of a Changeable object that has IsChangeable==true, meaning that what is retrieved is guaranteed to be writable. As generally represented in FIGS. 8–10, executing this code results in (1) another stops node 804 inserted into the hierarchy that points to each of the individual stops (FIG. 8); (2) a copy 910 (FIG. 9) of the second stop node (stop node [1], labeled 810 in FIGS. 8 and 9, that has the "blue" property below) to be made, such that the parent of this copy, the previously copied stops node 804, has as its child this copy 910 (instead of the original stop node 810 for the blue property); and (3) changes the blue property of this node 910 to orange, as represented in FIG. 10. Note that Orange is a value type denoted by the diamond shapes in the figures, and subsequent changes result in no allocation, such as the change to the color Red in FIG. 11.

When in an unchangeable state, a changeable object may be read from and written to from any context. If in a changeable state, then a UiContext, determined at construction time, may be used to associate with the changeable object so as to only allow access from that context. If MakeUnchangeable is later called, the context goes to null. Also, anytime a Copy( ) of a changeable is made, the new copy gets the UIContext from the caller, not from the context of the source changeable. The API provides a UIContext get-only property on changeable which is null when immutable. This property is public so that applications can tell whether a given object may be accessed.

Changeable objects constructed with null passed into the constructor will be defined with a null UIContext. If a changeable object has a null UIContext and the IsChangeable property is set to true, then the application needs to manage any possible thread contention issues that may arise. In this case, the system does not prevent concurrent access from multiple contexts.

A situation can arise whereby a changeable object is attempting to embed another changeable object into it (e.g., setting a gradient stop in a linear gradient brush), and the UIContexts do not match. For example, consider a LinearGradientBrush lgb having a UIContext of A, while a GradientStop gs has both a UIContext of B, and a StatusOfNextUse equal to ChangeableReference. Attempting to set gs into lgb will result in an exception being raised, as this is an attempt to mix UIContexts, which is disallowed.

When a change is made to a changeable object, the Changed event is raised, and that changeable is provided as the sender object for the event handler. However, there are situations when sending the object that actually changed is not desirable, and wherein having a different object as the sender would be more helpful. An example of this is with animated objects, where an animation (itself a changeable) holds onto a timeline (sometimes referred to as a clock) that describes its animation behavior. Events such as Pause( ) occur on the timeline, and not the animation, but generally applications want to know that the animation has paused.

Various solutions are possible, such as to fire changed events up the chain of changeables. This presents a number of problems, including deciding where to stop, causing notification storms with many more events fired even when nothing is receiving and/or using the events, and that changeables, by design, do not know their parents, but rather generally only know what to notify in the event of a change. Having a scheme in which changeables tracked their parents would require additional storage and bookkeeping. Notwithstanding, such a solution may be implemented.

Another solution is to implement a changeable such that the sender is the changeable object, and not the inner changeable that actually changed. The PropagateEventHandler is implemented to not push down the handler it receives, but rather store that handler off, create a new, local handler that, when invoked, calls the stored handler, but with the changeable as the sender argument. The new local handler is pushed down to PropagateEventHandler on the changeable children. Note that this technique intercepts every event handler, requiring that PropagateEventHandler is correctly handled when called with 'false' (when handlers are to be removed), thus requiring that bookkeeping be performed.

Note that this solution does not have an explicit BeginChange/EndChange scoping mechanism, making it more straightforward and robust in the face of exceptions (since there is no modality involved, and no EndChange( ) that can get skipped passed by an unexpected exception). However, Begin/EndChange existed to allow "getters" of objects to not have to make shallow clones of the values they are getting, when those clones were frozen and the system was not in write mode. Otherwise, those frozen values, in write mode, get a shallow clone made of them. As a result, the tree is exploded out more frequently than with Begin/EndChange, and can do so when there is absolutely no setting involved, just getting. Notwithstanding, if a getter is being invoked on an unchangeable value to begin with, it will not make a shallow clone (note this is distinct from the getter being invoked on a changeable value, and the value that is being obtained via "get" is unchangeable, which is where the clone operation happens).

By way of example, if accessing Btn.Background.Opacity, and Btn.Background is not changeable (e.g., as by default), then a copying is not made. Instead, the copying will occur when "Btn.Background=Btn.Background.ChangeableValue" or the like takes place, meaning that the copying expense only occurs if used. In other words, it an intent to change the value is not expressed, then arbitrary "getting" does not incur the copy cost. Note that if values maintain a notion of their "last created clone" then that clone can be handed out on use of the object, as long as the object has not been changed since the clone was made (such changes just result in letting go of that cached clone). This allows more sharing. Further, note that the control implementers are not as unduly burdened by participating in this pattern as it is for the pattern to be useful to users. Similarly, if type extensibility is provided, writing MediaTypes should not be overly complex.

The control implementer is presented with the same model for dealing with a Changeable as with any other value. For instance, the following code provides a Grid control with an AlternateBrush property of type Brush:

```
public static readonly DynamicProperty AlternateBrushID = ...;
private Brush _alternateBrush;
public Brush AlternateBrush
{
  get
  {
    return ComputeValue(AlternateBrushID,
            ref _alternateBrush);
  }
  set
  {
    WriteLocal(AlternateBrushID, value);
  }
}
```

The changeable type implementer needs a one line preamble and a one line postscript on anything that modifies a changeable (e.g., properties). Also, a simple, one line preamble is needed on objects that access state of a changeable (e.g., property getters). Needed are implementations of CloneCore( ), MakeUnchangeableCore( ), PropagateEventHandlerCore( ), PropagateEventHandlers( ) (note that the last three are only needed for types that have other Changeables as properties), and also needed is a typesafe-wrapper for Copy( ).

The following examples come from the referenced prototype, including an (artificial) example of a GradientStop which is a simple changeable type (which is simplified in that none of its subtypes are changeables). Note that in practice, very few changeables will be this simplified, in that anything that contains an animation collection (itself a changeable) will be more complex:

```
public class GradientStop : Changeable
{
  public GradientStop( )
  {
  }
  public GradientStop(Color color, float location)
  {
    _color = color;
    _location = location;
  }
  public Color Color
  {
    get
    {
      ReadPreamble( );
      return _color;
    }
    set
    {
      // This is the pattern for setting simple value types.
      WritePreamble( );
      if (_color != value)
      {
        _color = value;
        WritePostscript( );
      }
    }
  }
  public float Location
  {
    get
    {
      ReadPreamble( );
      return _location;
    }
    set
    {
      // This is the pattern for setting simple value types.
      WritePreamble( );
      if (_location != value)
      {
        _location = value;
        WritePostscript( );
      }
    }
  }
  // Create a new, typesafe version of Copy( ).
  public new GradientStop Copy( )
  {
    return (GradientStop)base.Copy( );
  }
  protected override Changeable CloneCore(bool shallowClone)
  {
    // Shallow and deep are treated the same here when
    // all members are value types
    return new GradientStop(_color, _location);
  }
  private Color _color;
  private float _location;
}
```

The following is an example of a LinearGradientBrush which is a more complex changeable type (because some of its subtypes, namely GradientStops, are themselves changeable):

```
public class LinearGradientBrush : Brush
{
    public LinearGradientBrush( )
    {
    }
    public LinearGradientBrush(Gradientstop stop1, GradientStop stop2,
                              double opacity)
        : base(opacity)
    {
        // Assigning through the properties results in "using" the
        // Parameters.
        Stop1 = stop1;
        Stop2 = stop2;
    }
    public GradientStop Stop1
    {
        get
        {
            _stop1 = (GradientStop)EmbeddedChangeableGetter(_stop1);
            return _stop1;
        }
        set
        {
            if (_stop1 != value)
            {
                _stop1 = (GradientStop)EmbeddedChangeableSetter
                    (_stop1, value);
                WritePostscript( );
            }
        }
    }
    public GradientStop Stop2
    {
        get
        {
            _stop2 = (GradientStop)EmbeddedChangeableReader(_stop2);
            return _stop2;
        }
        set
        {
            if (_stop2 != value)
            {
                _stop2 = (GradientStop)EmbeddedChangeableWriter
                    (_stop2, value);
                WritePostscript( );
            }
        }
```

```
    }
}
// In place modification to r/o (or check whether it can be done).
// Helpers check if arguments are null.
protected override bool MakeUnchangeableCore(bool checking)
{
    return Changeable.MakeUnchangeable(_stop1, checking);
        && Changeable.MakeUnchangeable(_stop2, checking);
}
// Propagation of event changes
protected override void
PropagateEventHandlerCore(EventHandler handler,
                          bool adding)
{
    Changeable.ModifyHandlerIfChangeable(_stop1, handler, adding);
    Changeable.ModifyHandlerIfChangeable(_stop2, handler, adding);
}
protected override Changeable CloneCore(bool shallowClone)
{
    // Always use member fields, not properties, for cloning.
    // Otherwise you inadvertently cause extra shallow copying.
    if (shallowClone)
    {
        return new LinearGradientBrush(_stop1, _stop2, _opacity);
    }
    else
    {
        return new LinearGradientBrush(
            (GradientStop)Changeable.CloneDownToUnchangeable
                (_stop1),
            (GradientStop)Changeable.CloneDownToUnchangeable
                (_stop2),
            _opacity);
    }
}
private GradientStop _stop1;
private GradientStop _stop2;
}
```

The changeable object model is divided into a public part, and a part which is what extenders and hosters see. Note again, though, that things are straightforward for the component writer that uses these types.

```
// PUBLIC API. Everyone expected to use this portion of the API.
// Anything outside of this section will be hidden
// from the editors.
public abstractclass System.Windows.Changeable
{
    public bool IsChangeable { get; } // defaults to true
    public Changeable Copy( );
    public void MakeUnchangeable( );
    public bool CanMakeUnchangeable { get; }
    public UseStatus StatusOfNextUse { get; set; } // defaults to false
    public event EventHandler Changed { add; remove; }
    public UIContext UIContext { get; } // null if IsChangeable==false
    public bool AllowChangeableReferenceOverride { get; set; }
                    // defaults to false
    // protected stuff shown below.
}
Public enum System.Windows.UseStatus
{
    Unchangeable,
    ChangeableCopy,
    [EditorState.Advanced]
    ChangeableReference
}
public class System.Windows.Changeable
{
// COMPONENT WRITER API. This is for use by Component Writers
// (Note: there is nothing that component writers need to know about)
```

```
// EXTENDER API. This is for use by those who write new Changeables
protected Changeable( );    // use UIContext.CurrentContext
protected Changeable(UIContext context);
// Subtypes implement this to provide cloning as described above.
protected abstract Changeable CloneCore(bool shallowClone);
// Subclasses implement to freeze their complex subtypes (when
// 'checking' is false, or to check whether they can (when
// 'checking' is true. Note that when checking is false, the return
// boolean doesn't really make sense, but implementers are to return
// 'true' in this case, so that calling code (like the above example)
// will work correctly. If a call is made with 'true' that cannot
// actually make the value unchangeable, then the implementation should
// raise an exception.
// The default implementation returns true in these cases.
protected virtual bool MakeUnchangeableCore(bool checking);
// Subclasses implement to push down changes to event handlers
// that happen up above (default impl is empty). If adding is true
// then the handler should be added to sub-changeables, else it
// should be removed from them as described above
protected virtual void PropagateEventHandler(EventHandler handler,
                            bool adding);
// Subclasses implement to validate that their in a good state. They
// throw a meaningful exception if not. This will be called on
// WritePostscript( ), EmbeddedChangeableWriter( ).
// Default impl is empty.
protected virtual void ValidateObjectState( );
// Called when there's a change to the value. Default implementation
// invokes registered Changed handlers.
protected virtual void OnChanged( );
// Call from anything that reads an embedded changeable out of
// a changeable (Reader) or writes an embedded changeable into
// a changeable (Writer). The primary uses of these are for property
// sets and gets. See examples above.
protected Changeable EmbeddedChangeableReader(Changeable property);
protected Changeable EmbeddedChangeableWriter(Changeable originalChangeable,
                            Changeable newChangeable);
// Call from simple property setters and getters, or anything that
// access non-Changeable state on a Changeable. See examples above.
protected void ReadPreamble( );
protected void WritePreamble( );
// Call from both simple and complex property setters and anything else
// that sets state on a Changeable. See examples above.
protected void WritePostscript( );
//// Static helper methods
// Create a deep, unchangeable clone of the provided Changeable, but stop at nodes
// that are already unchangeable (since those can just be "cloned" by handing
// out references to them). If null is passed in, null is returned
static protected Changeable CloneDownToUnchangeable(Changeable changeable);
// Make the specified Changeable be unmodifiable (IsChangeable == false) and
// returns true when the 'checking' parameter is 'false'. Otherwise, it checks
// to see if the changeable can be made unchangeable, returning true or false
// as appropriate. If null is passed in as the changeable, this operation
// doesn't do anything and returns 'true'.
static protected bool MakeUnchangeable(Changeable changeable, bool checking);
}
// UsageOverride to be used in ChangeableHelper.UseChangeable
public enum ChangeableUsageOverride
{
   NoOverride, // default, use as prescribed
   ForceUnchangeable,    // force the "use" to be unchangeable
   PreferChangeableReference // as described above.
}
// This helper class exists to reduce OM clutter on
// the core Changeable type.
public class System.Windows.ChangeableHelper
{
// HOSTING API. This is for use by systems other than the Property System
// that are going to host these values. The Property System will use
// these entry points for their own hosting in WriteLocal
// remove handler from getting notified of changes to oldChangeable
static public void UnsubscribeChangeable(Changeable changeable,
                            EventHandler handlerToRemove);
// return a Changeable, adding handler to getting notified of changes to it,
// if any. Note that this is a "use" of the Changeable, and the returned value
// will follow the "use" semantics. If "usageOverride" is NoOverride, all
// proceeds as expected, if it's "ForceUnchangeable", then
// always treat the Changeable as StatusOfNextUse==UseStatus.Unchangeable.
// See above for a description
static public Changeable UseChangeable(Changeable changeable,
```

```
        EventHandler handlerToAssociate,
        ChangeableUsageOverride usageOverride);
}
```

Note that the act of a qualified use of a Changeable, relying solely on its StatusOfNextUse, does not work exactly in every situation. In general, the problem is that when a changeable object (such as Brush, VideoData, and so forth) gets assigned into a Element property (like VideoElement.Source), that changeable is "used" in a qualified use. In the case of animate Changeables (such as VideoData, but also any animation), the act of "using" creates a clone, which is the correct and expected behavior. Then, when the elements' OnRender( ) method is invoked, the OnRender( ) implementation typically pushes the value into a DrawingContext, e.g., through DrawingContext.DrawVideo(videoData, . . . ). This call into the DrawingContext also "uses" the Changeable (videoData in this case), resulting in another clone being made.

Both behaviors of when changeables are "used" in this manner are correct and make sense, when considered in isolation. However, the problem occurs when they combine, in that the implementer of the control does not expect a qualified use every time OnRender( ) is invoked, and there really is no benefit in doing so, since this use is not exposed to the application, and indeed, is pure overhead that should be eliminated. Moreover, when dependent animations and independent animations combine, OnRender( ) will be frequently called, and animations will be repeatedly copied, which is not correct behavior. A mechanism called ChangeableReference allows for a "use" to not actually copy, but to instead only obtain a reference to the value being used.

A solution is to have cooperation between an entity like the DrawingContext and the DependencyProperties on a DependencyObject. In particular, the DependencyProperty of a control, when having a value set into it, needs to indicate that it will "allow" the Changeable to be treated as a ChangeableReference if the particular context in which it is subsequently used wants it to be such. Then, the DrawingContext operations say indicate that they would "prefer" for the Changeable to be treated as a ChangeableReference, provided the Changeable itself will allow it.

To this is, there is provided a Boolean property named Changeable.AllowChangeableReferenceOverride and the enumeration ChangeableUsageOverride, used in ChangeableHelper.UseChangeable. In this implementation, UseChangeable works as before with true/false mapping to ForceUnchangeable/NoOverride. If UseChangeable is called with PreferChangeableReference and the changeable has IsChangeable=true, and the changeable has AllowChangeableReferenceOverride=true, then the use of the Changeable will be as a ChangeableReference.

This is used by having DependencyObject.SetValue( ) set the Changeable it has retained (when it is modifiable) to AllowChangeableReferenceOverride, and having DrawingContext methods invoke UseChangeable with UsageOverridePreferChangeableReference.

Note that when both conditions are not true, the correct behavior also occurs, in that Elt2.Prop=Elt1.Prop will use the property as expected in a qualified use, copying it if it is modifiable, unless it has been explicitly set to ChangeableReference, since UseChangeable will not be invoked with the PreferChangeableReference. Direct usage of the DrawingContext will also function appropriately, since the Changeables being sent down to it will not have AllowChangeableReferenceOverride.

Note that when there is a changeable where a subobject of it is ChangeableReference, a shallow clone and a deep clone may be made. A Shallow Clone should work, as the CloneCore method will create a new shallow "shell", and assign over the children, not going deeper into them. With deep clones, the process is straightforward in the case of a tree of ChangeableCopys and Unchangeables, by cloning down to Unchangeables, making each clone along the way itself be Unchangeable (assuming CanMakeUnchangeable is true). This results in a deep clone where the top level is Changeable, and everything below it is Unchangeable. Note that dotting down will make the sub-elements modifiable again.

However, when there is a ChangeableReference, the clone operation needs to be effectively performed, however a reference is maintained for a "Changeable" path down to the ChangeableReference. This is needed so that when there is a notification from the ChangeableReference, the correct handlers get invoked for everywhere that it is hosted.

Consider the following example:

```
Brush b = new LinearGradientBrush( );
b.Stops = new GradientStopCollection( );
GradientStop gs = new GradientStop( );
gs.StatusOfNextUse = UseStatus.ChangeableReference;
b.Stops.Add(gs);
Button button1, button2;
button1.Background = b;
button2.Background = b;
(or button2.Background = button1.Background)
gs.Color = Colors.Purple;
```

Here, a LinearGradientBrush is created, as is its Stops collection and a single Stop, and is made a ChangeableReference. The brush may be used in multiple places, and a modification to the ChangeableReference GradientStop needs to affect both brushes.

Examples (Valid an Invalid) of Using Changeable Objects

The following section provides a summary of using and manipulating objects that derive from the Changeable class, by which objects, such as brushes, pens, and animations, are mutable as controlled by a programmer. Classes that derive from Changeable simulate mutability by automatically building an immutable version of themselves when used in a qualified use. As described above, a Changeable is considered used in a qualified use when the object is set into a Property System property, used as a sub-object in a complex Changeable object, or used in a DrawingContext command.

When developing applications with such objects, graphics and media system objects are generally created, set, used, and then never modified. For example, to set the background of a Button a programmer might use a SolidColorBrush, which derives from Changeable; but the programmer might never modify the button's background again over the course of the application. The following is one example:

```
// C#
SolidColorBrush myBrush = new SolidColorBrush(Colors.Yellow);
myBrush.Opacity = 0.5;
// A "use" of myBrush.
myButton.Background = myBrush;
        ' VB .NET
Dim myBrush As new _
MSAvalon.Windows.Media.SolidColorBrush
(MSAvalon.Windows.Media.
Colors.Yellow)
myBrush.Opacity = 0.5
' A "use" of myBrush.
myButton.Background = myBrush
```

When used in this manner, a Changeable behaves like a value type, such as a Rect or Color. The Changeable is copied into its destination, and changes to the original do not affect changes to the used value. However, there are situations where the programmer might need to modify such an object after it has been used. For example, suppose that the programmer want to change the background of the button in the previous code after the user clicks it.

The Changeable pattern exists to meet the needs of a variety of situations such as the one above. In general, a Changeable is a value that may or may not be modifiable, denoted by the value of the IsChangeable property. Attempting to modify the value when IsChangeable is false results in an exception. Furthermore, IsChangeable objects that can be modified raise their Changed events when they change or when any of their members is changed. When working with Changeables, it is thus important to understand when a Changeable is "used" in a qualified use.

By default, when a Changeable object is used in a qualified use, an immutable copy is created and that copy is actually used. The copy has an IsChangeable value of false. The following code causes an exception to be thrown because the code attempts to modify the unmodifiable copy of myBrush that was used to set the button's background:

```
// C#
SolidColorBrush myBrush = new
SolidColorBrush(Colors.Yellow);
myBrush.Opacity = 0.5;
myButton.Background = myBrush;
// Causes an exception to be thrown.
((SolidColorBrush)myButton.Background).Color =
Colors.Blue;
        ' VB .NET
Dim myBrush As new _
MSAvalon.Windows.Media.SolidColorBrush
(MSAvalon.Windows.Media.
Colors.Yellow)
myBrush.Opacity = 0.5
myButton.Background = myBrush
' Causes an exception to be thrown.
CType(myButton.Background,
    MSAvalon.Windows.Media.SolidColorBrush).Color = _
        MSAvalon.Windows.Media.Colors.Blue
```

Modifying the original Changeable object does not update the copies:

```
// C#
SolidColorBrush myBrush = new
SolidColorBrush(Colors.Yellow);
myBrush.Opacity = 0.5;
myButton.Background = myBrush;
// Does not change the background of the button.
myBrush.Color = Colors.Blue;
        ' VB .NET
Dim myBrush As new _
MSAvalon.Windows.Media.SolidColorBrush
(MSAvalon.Windows.Media.
Colors.Yellow)
myBrush.Opacity = 0.5
myButton.Background = myBrush
' Does not change the background of the button.
    myBrush.Color = MSAvalon.Windows.Media.Colors.Blue
```

To change the background of the button in this example, the programmer reassigns the modified brush to the button's background property:

```
// C#
SolidColorBrush myBrush = new
SolidColorBrush(Colors.Yellow);
myBrush.Opacity = 0.5;
myButton.Background = myBrush;
// Does not change the background of the button.
myBrush.Color = Colors.Blue;
// Updates the background of the button.
myButton.Background = myBrush;
        ' VB .NET
Dim myBrush As new _
MSAvalon.Windows.Media.SolidColorBrush
(MSAvalon.Windows.Media.
Colors.Yellow)
myBrush.Opacity = 0.5
myButton.Background = myBrush
' Does not change the background of the button.
myBrush.Color = MSAvalon.Windows.Media.Colors.Blue
' Updates the background of the button.
    myButton.Background = myBrush
```

The programmer can also use the Copy method to retrieve a modifiable copy of a used Changeable object. The retrieved copy is still reassigned back to the property to have an effect:

```
// C#
SolidColorBrush myBrush = new
SolidColorBrush(Colors.Yellow);
myBrush.Opacity = 0.5;
myButton.Background = myBrush;
SolidColorBrush anotherBrush =
(SolidColorBrush)myButton.Background.Copy( );
anotherBrush.Color = Colors.Purple;
// Updates the background of the button.
myButton.Background = anotherBrush;
        ' VB .NET
Dim myBrush As new _
MSAvalon.Windows.Media.SolidColorBrush
(MSAvalon.Windows.Media.
Colors.Yellow)
myBrush.Opacity = 0.5
myButton.Background = myBrush
Dim anotherBrush As new
MSAvalon.Windows.Media.SolidColorBrush
anotherBrush = _
    CType(myButton.Background.Copy,
MSAvalon.Windows.Media.SolidColorBrush)
anotherBrush.Color = MSAvalon.Windows.Media.Colors.Purple
' Updates the background of the button.
    myButton.Background = anotherBrush
```

Because this is not an ideal behavior of a Changeable in all situations, e.g., consider the programmer wanting to modify the used version (the working copy) of the Changeable, the Changeable class enables the programmer to specify how it behaves when used by providing the StatusOfNextUse property.

The StatusOfNextUse provides three options of how a Changeable behaves when used:

Unchangeable: The default behavior, shown in the examples in the previous section. When the Changeable object is used, it creates an immutable copy of itself which is used in place of the original object. The programmer may continue to modify the original object; the used version (the copy that was made) is unaffected by modifications to the original object and cannot be modified. To modify the used version, the Copy method is used to obtain a modifiable version, that version is updated, and the new version replaces the used version.

ChangeableCopy: When the Changeable object is used, it creates a modifiable copy of itself which is used in place of the original object. The programmer may continue to modify the original object; the used version (the copy that was made) is unaffected by modifications to the original object, but is also modifiable. The used version has a StatusOfNextUse of Unchangeable.

ChangeableReference: When the Changeable object is used, it provides a reference to itself. The programmer may continue to modify the original object; changes to the original object affect the used version-they are the same object.

The ChangeableCopy alters the behavior of a Changeable so that when used it creates a modifiable copy of itself, not an unmodifiable copy (as is the case with the default setting of Unchangeable). The following code (shown previously) throws an exception because the StatusOfNextUse property of myBrush has a default setting of Unchangeable:

```
// C#
SolidColorBrush myBrush = new
SolidColorBrush(Colors.Yellow);
myBrush.Opacity = 0.5;
myButton.Background = myBrush;
// Causes an exception to be thrown.
((SolidColorBrush)myButton.Background).Color =
Colors.Blue;
        ' VB .NET
Dim myBrush As new _
MSAvalon.Windows.Media.SolidColorBrush
(MSAvalon.Windows.
Media.Colors.Yellow)
myBrush.Opacity = 0.5
myButton.Background = myBrush
' Causes an exception to be thrown.
CType(myButton.Background,
MSAvalon.Windows.Media.SolidColorBrush).Color = _
        MSAvalon.Windows.Media.Colors.Blue
```

However, if the StatusOfNextUse property of the brush is set to ChangeableCopy, the code works as intended:

```
// C#
SolidColorBrush myBrush = new
SolidColorBrush(Colors.Yellow);
myBrush.StatusOfNextUse = UseStatus.ChangeableCopy;
myBrush.Opacity = 0.5;
myButton.Background = myBrush;
// Works because the brush has a UseStatus of
ChangeableCopy.
((SolidColorBrush)myButton.Background).Color =
Colors.Blue;
        ' VB .NET
Dim myBrush As new _
MSAvalon.Windows.Media.SolidColorBrush(MSAvalon.Windows.Media.
Colors.Yellow)
myBrush.StatusOfNextUse =
MSAvalon.Windows.UseStatus.ChangeableCopy
myBrush.Opacity = 0.5
myButton.Background = myBrush
' Works because the brush has a UseStatus of
ChangeableCopy.
CType(myButton.Background,
MSAvalon.Windows.Media.SolidColorBrush).Color = _
        MSAvalon.Windows.Media.Colors.Blue
```

The ChangeableCopy setting also keeps any sub-objects of the main object modifiable. In the following example, a LinearGradientBrush is given a StatusOfNextUse of ChangeableCopy. As a result, the LinearGradientBrush and its sub-objects remain modifiable after they've been used; the programmer does not have to set the StatusOfNextUse property of any Changeable objects contained by the object, such as the GradientStop in this example:

```
// C#
LinearGradientBrush myBrush = new LinearGradientBrush( );
myBrush.StatusOfNextUse = UseStatus.ChangeableCopy;
myBrush.GradientStops.Add(new GradientStop(Colors.Blue,
0));
myBrush.GradientStops.Add(new GradientStop(Colors.Green,
1));
myButton.Background = myBrush;
// Works because the brush has a UseStatus of
ChangeableCopy.
((LinearGradientBrush)myButton.Background).GradientStops[
0].Color = Colors.LightBlue;
        ' VB .NET
Dim myBrush As new
MSAvalon.Windows.Media.LinearGradientBrush
myBrush.StatusOfNextUse =
MSAvalon.Windows.UseStatus.ChangeableCopy
myBrush.GradientStops.Add( _
    new
MSAvalon.Windows.Media.GradientStop(MSAvalon.Windows.Media.
Colors.Blue,0))
myBrush.GradientStops.Add(new _
MSAvalon.Windows.Media.GradientStop(MSAvalon.Windows.Media.
Colors.Green, 1))
myButton.Background = myBrush
' Works because the brush has a UseStatus of
ChangeableCopy.
CType(myButton.Background, _
MSAvalon.Windows.Media.LinearGradientBrush).GradientStops
(0).Color = _
MSAvalon.Windows.Media.Colors.LightBlue
```

When using Changeable objects with a StatusOfNextUse of ChangeableCopy, the programmer can also retain a handle to the used version of the Changeable and use that reference to modify the object. In the following example, a reference to the used LinearGradientBrush is retrieved and used to modify the background of a button:

```
// C#
LinearGradientBrush myBrush = new LinearGradientBrush( );
myBrush.StatusOfNextUse = UseStatus.ChangeableCopy;
```

-continued

```
myBrush.GradientStops.Add(new GradientStop(Colors.Blue,
0));
myBrush.GradientStops.Add(new GradientStop(Colors.Green,
1));
myButton.Background = myBrush;
LinearGradientBrush usedBrush =
(LinearGradientBrush)myButton.Background;
// Works because the brush has a UseStatus of
ChangeableCopy.
usedBrush.GradientStops[0].Color = Colors.LightBlue;
    ' VB .NET
Dim myBrush As new
MSAvalon.Windows.Media.LinearGradientBrush
myBrush.StatusOfNextUse =
MSAvalon.Windows.UseStatus.ChangeableCopy
myBrush.GradientStops.Add( _
    new
MSAvalon.Windows.Media.GradientStop(MSAvalon.Windows.Media.
Colors.Blue,0))
myBrush.GradientStops.Add( _
    new
MSAvalon.Windows.Media.GradientStop(MSAvalon.Windows.Media.
Colors.Green,1))
myButton.Background = myBrush
Dim usedBrush As new
MSAvalon.Windows.Media.LinearGradientBrush
usedBrush - Ctype(myButton.Background,
LinearGradientBrush)
' Works because the brush has a UseStatus of
ChangeableCopy.
usedBrush.GradientStops(0).Color =
MSAvalon.Windows.Media.Colors.LightBlue
```

The ChangeableReference setting alters the behavior of a Changeable so that it provides a reference to itself when used. The programmer may continue to modify the original object; changes to the original object affect the used version because they are the same object. The following is an example:

```
// C#
SolidColorBrush changeableReferenceBrush = new
SolidColorBrush( );
changeableReferenceBrush.Color = Colors.LimeGreen;
button1.Background = changeableReferenceBrush;
button2.Background = changeableReferenceBrush;
button3.Background = changeableReferenceBrush;
// Changes the color of the three buttons.
changeableReferenceBrush.Color = Colors.Purple;
// Also changes the color of all three buttons.
((SolidColorBrush)button1.Background).Color =
Colors.Blue;
    ' VB .NET
Dim changeableReferenceBrush As new
MSAvalon.Windows.Media.SolidColorBrush
changeableReferenceBrush.Color =
MSAvalon.Windows.Media.Colors.LimeGreen
button1.Background = changeableReferenceBrush
button2.Background = changeableReferenceBrush
button3.Background = changeableReferenceBrush
' Changes the color of all three buttons.
changeableReferenceBrush.Color =
MSAvalon.Windows.Media.Colors.Purple
' Also changes the color of all three buttons.
CType(button1.Background,
MSAvalon.Windows.Media.SolidColorBrush).Color = _
    MSAvalon.Windows.Media.Colors.Blue
```

CONCLUSION

As can be seen from the foregoing detailed description, there is provided a changeable pattern and implementation that allows reference types to share many of the benefits of value types without the limitations of value types. The changeable pattern and implementation allows immutability, while providing flexibility for restricting the modifiability of the resultant use of the values, as well as providing a means for notifying interested listeners when changes occur. The present invention works well with types that have a deep nesting to them, e.g., where instances of the types are complex. The invention further minimizes the amount of copying required while meeting the requirements of the changeable pattern.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
    maintaining a base class, the base class comprising two properties, isChangeable and statusOfNextUse;
    receiving a request for a type, the type deriving from the base class and inheriting the properties of the base class;
    causing the type to be created, and upon being created, the type's isChangeable property set to allow a change, and the type's statusOfNextUse property set not to allow a change upon a next qualified use; and
    upon a next qualified use, causing the type to be cloned, the cloned type having an isChangable property set not to allow a change.

2. The method of claim 1 further comprising, receiving a request to copy the type, and in response, causing the type to be cloned, the cloned type having a changeable property set to allow a change and a status property set to allow a change upon a next qualified use.

3. The method of claim 2 further comprising, receiving a request to copy the cloned type, and in response, causing the cloned type to be cloned into a second cloned type, the second cloned type having a changeable property set to allow a change and a status property set to not allow a change upon a next qualified use.

4. The method of claim 1 further comprising, receiving a request to set the type to not allow a change, and in response, causing the type to have the changeable property not allow a change.

5. The method of claim 4 wherein the type has an associated object tree, and further comprising, recursively setting property data in the object tree to not allow a change to any object in the tree.

6. The method of claim 4 further comprising, receiving a request to copy the type, and in response, causing the type to be cloned, the cloned type having a changeable property set to allow a change and a status property set to not allow a change upon a next qualified use.

7. The method of claim 1 further comprising, receiving a request directed towards whether a changeable object is allowed to be made unchangeable, determining whether the changeable object is allowed to made unchangeable, and returning a response to the request based on that determination.

8. The method of claim 1 further comprising, receiving a request to modify the status property to allow a changeable copy, and in response, causing the type to have the status property set to a state in which the type is cloned upon a next qualified use, the cloned type having a changeable property set to allow a change and a status property set to not allow a change.

9. The method of claim 1 further comprising, receiving a request to modify the status property to allow a changeable reference, and further comprising, causing the type to have the status property set to allow a change upon a next qualified use.

10. The method of claim 9 further comprising, providing a notification of the change upon the next qualified use.

11. The method of claim 10 wherein providing the notification comprises propagating event handlers hierarchically down the type, such that a deep node need not communicate with a parent node to provide a notification associated with the type when the deep object has changed.

12. The method of claim 1 further comprising, determining whether a next us is a qualified use.

13. A computer-readable medium having computer-executable instructions, which, when executed, perform the method of claim 1.

14. In a computing environment, a method comprising:
providing a type, the type comprising properties isChangeable and statusOfNextUse, the isChangeable property set to allow a change and the statusOfNextUse property set to changeableReference; and
upon receiving a request to change data of the type in a qualified use, and based on the isChangeable property and statusOfNextUse property, allowing the data to change in the type and leaving the type in the changeableReference state.

15. The method of claim 14 further comprising, causing a notification of the change to be provided.

16. The method of claim 15 wherein the change is to a hierarchically deep node in the type having an event handler propagated thereto, and wherein providing the notification comprises sending the notification from the deep node based on the event handler without the deep node having to have knowledge of a parent node.

17. The method of claim 14 further comprising, receiving a request requesting whether a changeable object is allowed to be made unchangeable, determining whether the changeable object is allowed to made unchangeable, and returning a response to the request based on that determination.

18. The method of claim 17 wherein the changeable object is allowed to made unchangeable, and further comprising, receiving a request to modify the status property to an unchangeable setting, and in response, causing the type to enter another state in which the changeable property is set to changeable and the status property is set to unchangeable upon a next qualified use.

19. The method of claim 14 further comprising, receiving a request to modify the status property to a changeable copy, and in response, causing the type to enter a changeable copy state in which upon a subsequent qualified use, a cloned type is made having a changeable property set to allow a change and a status property set to not allow a subsequent change.

20. A computer-readable medium having computer-executable instructions, which, when executed, perform the method of claim 14.

21. A computer-readable medium having stored thereon a data structure, the data structure comprising:
a data field representing a first property having data corresponding to whether a type is changeable or unchangeable;
a data field representing a second property having data corresponding to a state of the type upon a subsequent use; and
wherein when the first property corresponds to a changeable state:
  1) when the second property has a setting corresponding to unchangeable, a qualified use of the type causes a clone to be created, the clone having a first property that is set to unchangeable;
  2) when the second property has a setting corresponding to changeable copy, a qualified use of the type causes a clone to be created having a first property that is set to make the clone changeable and a second property set to unchangeable such that a subsequent use of the clone will create another clone, the other clone having a first property that corresponds to unchangeable; and
  3) when the second property has a setting corresponding to changeable reference, a qualified use of the type remains in a state in which the first property corresponds to a changeable state and the a second property setting corresponds to changeable reference.

22. The data structure of claim 21 further comprising a copy method that when invoked causes a causes a clone to be created, the clone having a first property that is set to changeable and a second property set to unchangeable such that a subsequent use of the clone will create another clone, the other clone having a first property that corresponds to unchangeable.

23. The data structure of claim 21 further comprising a method that when invoked causes the first property to change from the changeable state to the unchangeable state.

24. The data structure of claim 21 further comprising a method that when invoked causes the second property setting to change from unchangeable to changeable copy.

25. The data structure of claim 21 further comprising a method that when invoked causes the second property setting to change from unchangeable to changeable reference.

26. The data structure of claim 21 further comprising a method that when invoked causes the second property setting to change from changeable copy to unchangeable.

27. The data structure of claim 21 further comprising a method that when invoked causes the second property setting to change from changeable reference to unchangeable.

28. The data structure of claim 21 further comprising a method that when invoked causes the second property setting to change from changeable reference to changeable copy.

29. The data structure of claim 21 further comprising a method that when invoked causes the second property setting to change from changeable copy to changeable reference.

30. The data structure of claim 21 further comprising a third property indicative of whether the data structure can be made unchangeable while ensuring consistency, and a method that when invoked causes a response corresponding to the third field.

31. In a computing environment, a system comprising:
means for maintaining a parent class from which a type subclass may derive, the parent class comprising properties isChangeable and statusOtNextUse;
means for providing a type corresponding to a subclass of the parent class, the subclass further comprising contained data;

means for setting the type into one of a plurality of states defined by settings of the properties of the parent class associated with the type;

means for receiving a request to change the contained data of the type in a qualified use; and means for determining how to process the request based on the property settings.

32. The system of claim 31 wherein one of the plurality of states comprises a changeable reference state in which a changeable property allows a change, and a status property specifies that the type is a changeable reference, and wherein the means for determining how to process the request allows the change and leaves the type in the changeable reference state.

33. The system of claim 32 further comprising, means for causing a notification of the change to be provided.

34. The system of claim 31 further comprising, means for receiving a request to modify the status property to an unchangeable setting, and means for causing the type to enter a state in which the changeable property set to allow a change and the status property set to not allow a change upon a next qualified use.

35. The system of claim 31 further comprising, means for receiving a request to modify the status property to a changeable copy, and means for causing the type to enter a changeable copy state in which upon a subsequent qualified use, a cloned type is made having a changeable property set to allow a change and a status property set to not allow a subsequent change.

36. In a computing environment, a method comprising:
receiving a request to copy a type, the type being derived from a parent class, the type containing hierarchically deep data;
in response to the request, causing a shallow copy of the type to be created, the shallow copy not containing the hierarchically deep data upon being created; and
upon access to at least some of the hierarchically deep data being requested, copying the at least some of the hierarchically deep data to the shallow copy to enable the shallow copy to act as a deep copy.

37. In a computing environment, a method comprising:
receiving a request related to a type, the type having a first property corresponding to whether that type is changeable or unchangeable and having a second property corresponding to a state of the type upon a subsequent use;
determining whether the request corresponds to a qualified use; and
when the request corresponds to a qualified use and the first property corresponds to a changeable state:
1) when the second property has a setting corresponding to unchangeable, causing a clone of the type to be created, the clone having a first property that is set to unchangeable;
2) when the second property has a setting corresponding to changeable copy, causing a clone of the type to be created having a first property that is set to changeable and a second property set to unchangeable such that a subsequent qualified use of the clone will create a clone of the clone, the clone of the clone having a first property that is set to make the clone of the clone changeable and a second property set such that a subsequent use of the clone of the clone will make the clone of the clone unchangeable; and
3) when the second property has a setting corresponding to changeable reference, remaining in a state in which the first property corresponds to a changeable state and the a second property setting corresponds to changeable reference.

38. In a computing environment, a method comprising:
providing a reference object, the reference object having a first property corresponding to whether the reference object is changeable or unchangeable and a second property corresponding to a state of the reference object upon a subsequent use; and
using the property values to determine a state of the reference object following a qualified use such that the reference object includes characteristics of a value type wherein a shallow copy is created of the reference object on cloning and a deep copy is created on demand when hierarchically deep data within the reference object is accessed.

* * * * *